United States Patent
Sethuram et al.

(10) Patent No.: US 7,606,265 B1
(45) Date of Patent: Oct. 20, 2009

(54) METHOD AND APPARATUS FOR TRANSCEIVING MULTIPLE SERVICES DATA SIMULTANEOUSLY OVER SONET/SDH

(75) Inventors: Jay Sethuram, Saratoga, CA (US); Amir Nayyarhabibi, Los Altos, CA (US); Chandra Shekhar Joshi, Saratoga, CA (US); Rajiv Kane, Fremont, CA (US); Richard Joseph Weber, Mountain View, CA (US); Srinivasa R. Malladi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 923 days.

(21) Appl. No.: 10/141,264

(22) Filed: May 8, 2002

Related U.S. Application Data

(62) Division of application No. 09/146,088, filed on Sep. 2, 1998, now Pat. No. 6,765,928.

(51) Int. Cl.
*H04J 3/00* (2006.01)

(52) U.S. Cl. .................. 370/476; 370/370; 370/374; 370/378; 370/381; 370/395.7; 370/463; 370/466; 370/474; 370/539

(58) Field of Classification Search ............ 370/370, 370/374, 378, 381, 395.7, 463, 466, 474, 370/476, 539
See application file for complete search history.

(56) References Cited

U.S. PATENT DOCUMENTS

| | | | |
|---|---|---|---|
| 4,967,405 A | 10/1990 | Upp et al. ............ 370/1 |
| 5,291,485 A | 3/1994 | Afify et al. .......... 370/77 |
| 5,323,390 A | 6/1994 | Pawelski ............. 370/63 |
| 5,345,441 A | 9/1994 | Paker et al. .......... 370/54 |
| 5,412,652 A * | 5/1995 | Lu ..................... 370/223 |
| 5,428,612 A | 6/1995 | Scheffel et al. ....... 370/84 |
| 5,563,890 A | 10/1996 | Freitas .............. 370/99 |
| 5,600,648 A | 2/1997 | Furuta et al. ........ 370/248 |
| 5,715,248 A | 2/1998 | Lagle, III et al. .... 370/366 |
| 5,717,693 A | 2/1998 | Baydar et al. ....... 370/514 |
| 5,784,377 A * | 7/1998 | Baydar et al. ....... 370/463 |
| 5,793,770 A | 8/1998 | St. John et al. ...... 370/401 |
| 5,878,045 A | 3/1999 | Timbs ............... 370/466 |
| 5,978,377 A | 11/1999 | Kim et al. ........... 370/397 |
| 6,058,114 A | 5/2000 | Sethuram et al. ..... 370/397 |
| 6,101,198 A | 8/2000 | Koenig et al. ....... 370/535 |
| 6,137,800 A | 10/2000 | Wiley et al. ......... 370/396 |
| 6,157,659 A | 12/2000 | Bird ................. 370/538 |
| 6,307,836 B1 | 10/2001 | Jones et al. ......... 370/230 |
| 6,584,118 B1 | 6/2003 | Russell et al. ....... 370/466 |

(Continued)

*Primary Examiner*—William Trost, IV
*Assistant Examiner*—Toan D Nguyen
(74) *Attorney, Agent, or Firm*—Campbell Stephenson LLP

(57) ABSTRACT

A method and apparatus for transceiving multiple service data from multiple communication services to a SONET/SDH communication system or network are provided. A SONET/SDH universal framer (SURF) bidirectionally provides communication between a SONET/SDH communication port and multiple service communication ports using their native data format. A SONET/SDH byte engine processes complex hierarchical SONET/SDH frames storing intermediate states when it changes to process a byte of data of a different STS-1 equivalent frame in a SONET/SDH STS-N frame. A service byte engine processes the multitude of service data formats and generally intermediate states are restored, processed, and saved when the service byte engine changes to process a different data stream or a different frame of data of a given service.

20 Claims, 16 Drawing Sheets

U.S. PATENT DOCUMENTS

| | | | |
|---|---|---|---|
| 6,816,487 B1 * | 11/2004 | Roberts et al. | 370/388 |
| 6,839,871 B2 | 1/2005 | Patel et al. | 714/707 |
| 6,898,647 B2 * | 5/2005 | Duvvuru | 710/33 |
| 2002/0154647 A1 | 10/2002 | Potash | 370/412 |
| 2002/0186719 A1 | 12/2002 | Subrahmanyan et al. | 370/506 |

* cited by examiner

FIG. 1A
(Prior Art)

METHOD AND APPARATUS FOR TRANSCEIVING MULTIPLE SERVICES DATA SIMULTANEOUSLY OVER SONET/SDH

This application is a divisional of U.S. patent application Ser. No. 09/146,088 entitled "Method and Apparatus for Transceiving Multiple Services Data Simultaneously over SONET/SDH," filed Sep. 2, 1998 now U.S. Pat. No. 6,765,928, which is assigned to the same assignee as the present application, and is hereby included by reference, in its entirety and for all purposes.

FIELD OF THE INVENTION

This invention relates generally to communication systems, particularly to the control of communication systems using SONET/SDH standards. More particularly, the invention relates to communication between multiple communication services and a SONET/SDH communication system or network.

BACKGROUND OF THE INVENTION

The Synchronous Optical Network ("SONET") standard was originally developed as a multiplexing and trunking mechanism to carry a large number of voice channels over a single optical fiber. SONET and SDH are a set of coordinated ITU, ANSI and Bellcore standards that define a hierarchical set of transmission rates and transmission formats. Bellcore originally proposed the standard in the late 1980's. Since then, the SONET standard has gained worldwide acceptance. Europe has adopted the SONET standard with a few minor modifications and is known as Synchronous Digital Hierarchy ("SDH"). Because of the standardization, interoperability between different vendor equipment has been achieved for the first time in WAN applications. In addition, because SONET/SDH transport is efficient, economical, robust and a reliable means to multiplex and transport a large number of voice channels over a single optical fiber, SONET/SDH deployment has progressed quickly and widely.

Although the original motivation for SONET/SDH specification was for transporting voice, the high bandwidth capability of SONET/SDH networks makes it attractive to transport multimedia traffic such as voice, video, and data efficiently on a single network. Recognizing this, SONET/SDH equipment vendors are now offering multimedia capability in their equipment. The solutions available today for incorporating multimedia services are inflexible and expensive because they require several single service devices to support multimedia services. Due to the enormous complexity of implementation, a single multiple service device has been unavailable that could support several protocols and formats of differing service types.

Figure 1A:
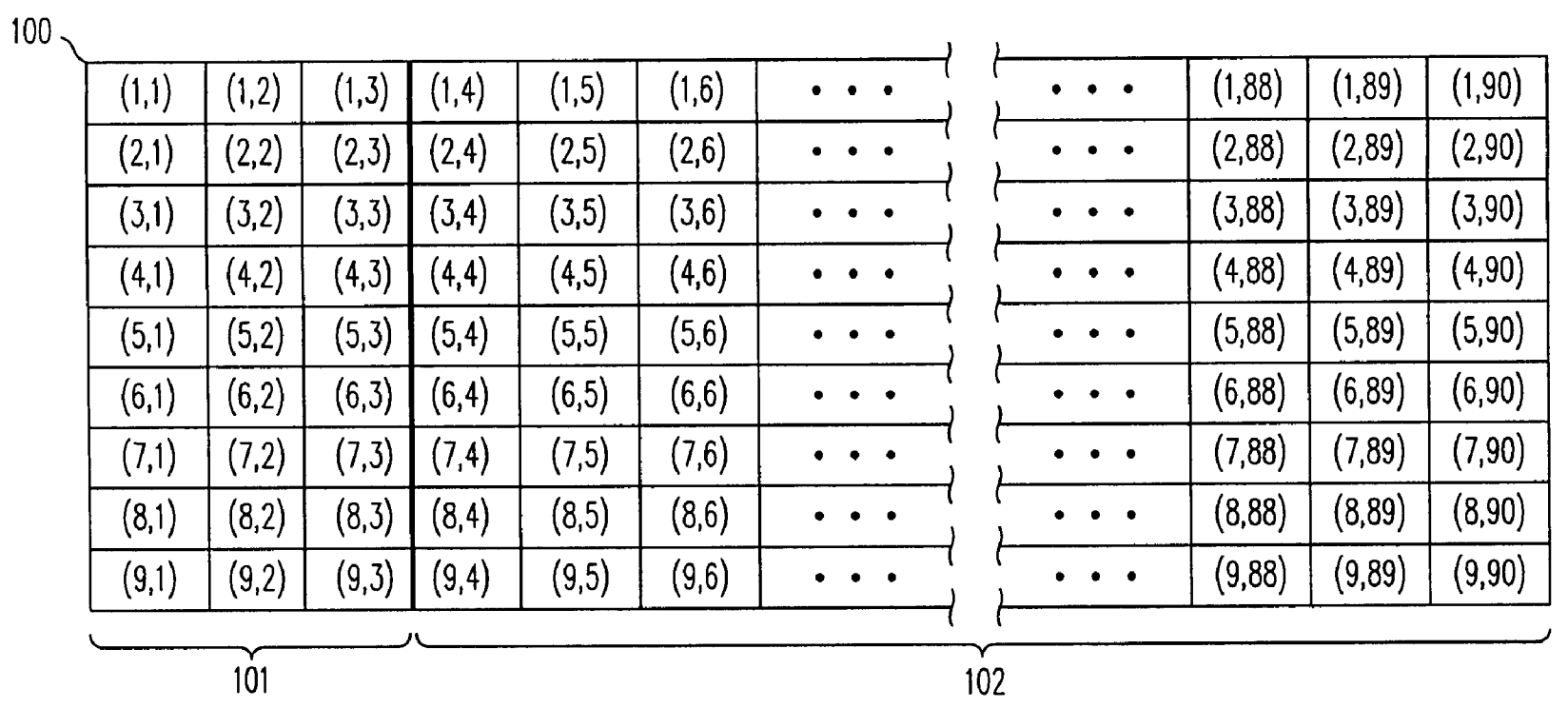

FIG. 1A illustrates the array of data bytes for a prior art SONET STS-1 frame 100. The STS-1 frame 100 consist of eight hundred and ten bytes and is always visually illustrated as array of 9 rows of 90 columns so that the Transport Overhead bytes (TOH) 101 line up properly at the beginning of the frame. As indicated in FIG. 1A, each byte in the STS-1 frame 100 can be associated with a column and row number of the frame. SONET overhead information is divided into section (SOH), line (LOH) and path (POH) overhead and is provided to manage the network and the transport of payload data 102. The section and line overhead make up the transport overhead (TOH) 101 of the STS-1 frame 100 and consist of 27 bytes in every STS-1 frame. The SONET payload data 102 is carried in a synchronous payload envelope (SPE), which makes up 9 rows by 87 columns of the STS-1 frame structure 100 or 783 bytes. Path overhead (POH) is contained within the SPE. The SPE can begin in any byte position within the STS-1 frame other than the first three TOH columns. Because there may be jitter and phase differences, the SPE does not need to be perfectly aligned within one SONET frame starting at the first row and fourth column in the STS-1 frame. The SPE may start at a different byte position and carry over into the next sequence of frames. The STS-1 frame is transmitted one row at a time, from top to bottom and from left to right within each row. Therefore, byte (1,1) in row 1, column 1 is sent first while byte (9, 90) in row 9, column 90 of a given frame is sent last. Other higher level SONET frames structures or hierarchies can be derived by knowing the frame structure for the STS-1 frame 100. For example the higher level SONET frame structure STS-3 has three times as many columns as the STS-1 and expands the SONET overhead information by three times. The overall frame structure of STS-3 is derived by simply interleaving a single byte at a time from each of the three equivalent STS-1s that make up an STS-3. The appearance is that every third column belongs to a given one of the equivalent STS-1 frames. The higher level SONET frame structure STS-48 is made up of 48 equivalent STS-1 frames such that every 48th column belongs to a given one of the STS-1 frames.

Referring to FIG. 1B, the generic higher level SONET frame structure STS-N 105 is made up of N equivalent STS-1 frame structures 100a-100n. The STS-N frame structure 105 has N times as many columns as the STS-1 100 ánd expands the SONET overhead information by N times as well as expanding the payload by N times. Every column represents a column from a given one of the N equivalent STS-1 frames 100a-100n that is interleaved into a column of a given one the STS-N frame 105. For example, the first column of the first equivalent STS-1 frame 100a is interleaved into the first column of the STS-N frame 105. The first column of the second equivalent STS-1 frame 100b is interleaved into the second column of the STS-N frame 105. The first column of the third equivalent STS-1 frame 100c is interleaved into the third column of the STS-N frame 105. The first column of the Nth equivalent STS-1 frame 100n is interleaved into the Nth column of the STS-N frame 105. Similarly, the last column of the Nth equivalent STS-1 frame 100n is interleaved into the last column of the STS-N frame 105. As a result, the transport overhead (TOH) 106 of the STS-N 105 frame structure has N times more bytes than the STS-1 frame 100 and the SONET payload data 107 which carries the SPE 107 has N times more bytes than the SPE 102 of the STS-1 frame 100. Note that the generic STS-N frame structure 105 reduces to standard frame structures when N is defined. For example, the STS-N frame structure 105 reduces to an STS-1 frame when N is 1. Similarly, the STS-N frame structure 105 reduces to an STS-48 frame structure when N is 48. As indicated in FIG. 1B, each byte in the STS-N frame 105 can be associated with a row number, column number, and a subcolumn number. The subcolumn number indicates the association of the equivalent STS-1 frames within the higher level STS-N frame structures. For example byte (1,1,1) of STS-N frame 105 having a row number 1, a column number 1, and a subcolumn number 1 is associated with byte (1,1) of the first equivalent STS-1 frame 100a. Byte (9,1,3) of STS-N Frame 105 having a row number 9, a column number 1, and a subcolumn number 3 is associated with byte (9,1) of the third equivalent STS-1 frame 100c. Byte (9,3,N) of STS-N frame 105 having a row number 9, a column number 3, and a subcolumn number N is associated with byte (9,3) of the Nth equivalent STS-1 frame 100n. Byte (9,90,N) of STS-N frame 105 having a row number 9, a column number 90, and a subcolumn number N is associated with byte (9,90) of the Nth equivalent STS-1 frame 100n.

Unchannelized or nonchannelized carriers are available in the SONET frame structure and are known as concatenated SONET frames. Concatenated SONET frames are referred to as STS-NC which has N concatenated SONET payload frames. N is presently defined by the SONET specifications for concatenated SONET payloads to be greater than 2.

The SONET payload for an STS-1 can be broken into smaller portions or payloads. The SPE of each STS-1 can be broken into seven virtual tributary groups (VTGs) each consisting of one hundred and eight bytes which occupies 12 columns of an SPE. Within each VTG there may be subrate virtual tributary (VT) types.

Currently defined subrate VT types include VT1.5, VT2, VT3, and VT6. VT1.5 is twenty-seven bytes or three nine byte columns and a single VTG can carry four VT1.5s. VT2 is thirty-six bytes or four nine byte columns and a single VTG can carry three VT2s. VT3 is fifty-four bytes or six nine byte columns and a single VTG can carry two VT3s. VT6 is one hundred eight bytes or twelve nine byte columns and a single VTG can carry one VT6. Similar to how the SPE can begin at different columns within a SONET frame, the payload for subrate VT types can float therein.

FIG. 1C illustrates a prior art implementation of providing communication between multiple services and a SONET/SDH communication system. The prior art system contains multiple inflexible devices each providing dedicated support for a single service type before being multiplexed onto the SONET/SDH stream. For example, Service#1 151, Service#2 152, and Service#3 153 may respectively be voice data, video data and generic data which may comprise multiple services. In this case, SONET Bandwidth 150, the network bandwidth in number of bits per second for transmission of a SONET frame, are allocated to the SONET overhead 160, Service#1 168, Service#2 169, and Service#3 170. Each of these services 151-153 require dedicated mappers 154-156 that can receive a certain type of communication service in its native data format, convert it into a specific type of non-native data format such as ATM cells or Packet data, and then map the service data in its non-native data format into an SPE of a fixed SONET frame. The mappers 154-156 each represent a different circuit and are dedicated to the type of data and thus work with only a single service type. The mappers 154-156 first transform the native data format of the service type into a non-native format that is standard with every mapper. For example, consider that mapper 154 receives TDM data, mapper 155 receives Packet data, and mapper 156 receives Frame Relay data. Before mappers 154-156 map any data into a SONET payload, they would convert the native data formats of TDM, Packets, and Frame Relay into ATM cells for example. Additionally, the mappers define a fixed number of service types and service streams that may only be changed by first removing the original hardware and replacing it with the desired new hardware. When receiving a SONET stream for communication to the multiple services, the dedicated demappers 171-173 are required that can demap the SONET frame and convert service data in a non-native data format back into its native data format for each of the services 151-153. In order to demap the SONET SPE into service data, each of the demappers 171-173 must know how to convert non-native service data format into the native service data format. Similar to the mappers 154-156, the demappers 171-173 each represent a different circuit and are dedicated to the type of service data it can handle and thus work with only a single service type.

A disadvantage of the prior art is that the bandwidth, the number of bits per second for transmission of a SONET frame, for each service is fixed by the bandwidth of the mapper and the de-mapper required for supporting the non-native format of the service data. Another disadvantage of the prior art is that it uses SONET/SDH bandwidth inefficiently particularly when a service type does not need the entire bandwidth associated with a mapper and a de-mapper. Another disadvantage of the prior art is that a given service type may not get sufficient bandwidth because of bandwidth limitations of the prior art mappers and demappers. A further disadvantage of the prior art is that the hardware employed in prior art SONET/SDH communication systems is inflexible and requires the removal of dedicated mapper and demapper circuits and insertion of new dedicated mapper and demapper circuits in order to make a change in the communication system.

BRIEF SUMMARY OF THE INVENTION

The present invention is a SONET/SDH universal framer (SURF) that interfaces at one communication port using SONET/SDH frames and interfaces with other communication services at other ports using the native data format of the service. In order to support the multiple communication ports a provisioning register is used to flexibly store provisioning information that describes the communication system and communication ports by describing the type of SONET/SDH frames expected, the types of services supported and the number of data streams of each service type. To process the multitude of SONET/SDH data formats and the Service data formats, byte engines are introduced whereby information is processed a byte at a time and intermediate processing states are restored, processed, and saved when it is necessary to preserve the state such as when changing to process a different data stream or a different frame of data. The SONET/SDH byte engine processes complex hierarchical SONET/SDH frames using the provisioning information describing the communication system and knowing the construction of the complex hierarchical SONET/SDH frames. Generally, intermediate states of the SONET/SDH byte engine are restored, processed, and saved when changing to process a different SONET/SDH frame of data. A service byte engine, comprising a plurality of simpler byte engines, is provided to process the multitude of Service data formats. Generally, when the service byte engine changes to process a different stream of the same Service data format, the intermediate states of that service byte engine are restored, processed, and saved, otherwise, the intermediate states are restored, processed, and saved when a different frame of data is processed. An elastic storage means, a memory, is used to allow the SONET/SDH byte engine and the Service byte engine to operate independent of one another in an asynchronous mode. The SONET/SDH byte engine stores information into the elastic storage means so that the Service byte engine can start processing it for transmission to the services. The Service byte engine stores information received from the services into the elastic storage means so that the SONET/SDH byte engine can start processing it for transmission out to the SONET/SDH supported communication system.

It is an object of the present invention to provide a single flexible device for the support of multiple services for SONET/SDH communication systems.

Another object of the present invention is to provide a flexible method of mapping multimedia services into SONET/SDH streams.

A still further object of the present invention is to eliminate the need for inflexible fixed bandwidth mappers and demappers of SONET/SDH communication systems thereby lowering the costs of such communication systems.

A still further object of the present invention is to provide a unified piece of hardware for processing SONET/SDH frames a byte at a time.

BRIEF DESCRIPTIONS OF THE DRAWINGS

FIG. 1A is a prior art diagram of the SONET STS-1 frame structure.

DETAILED DESCRIPTION OF THE PREFERRED EMBODIMENT

Figure 1B:
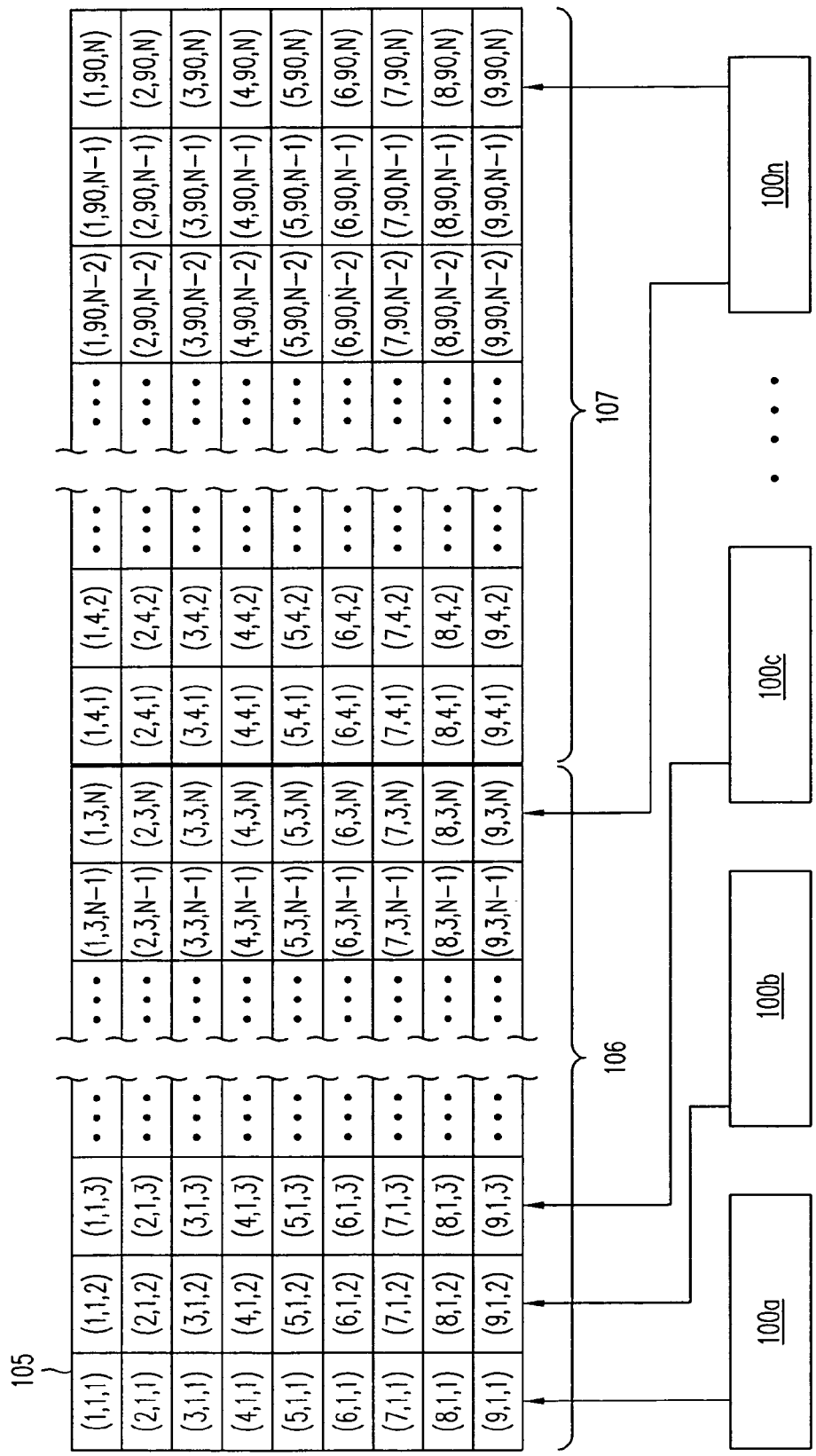
FIG. 1B is a prior art diagram of the SONET STS-N frame structure.
Figure 1C:
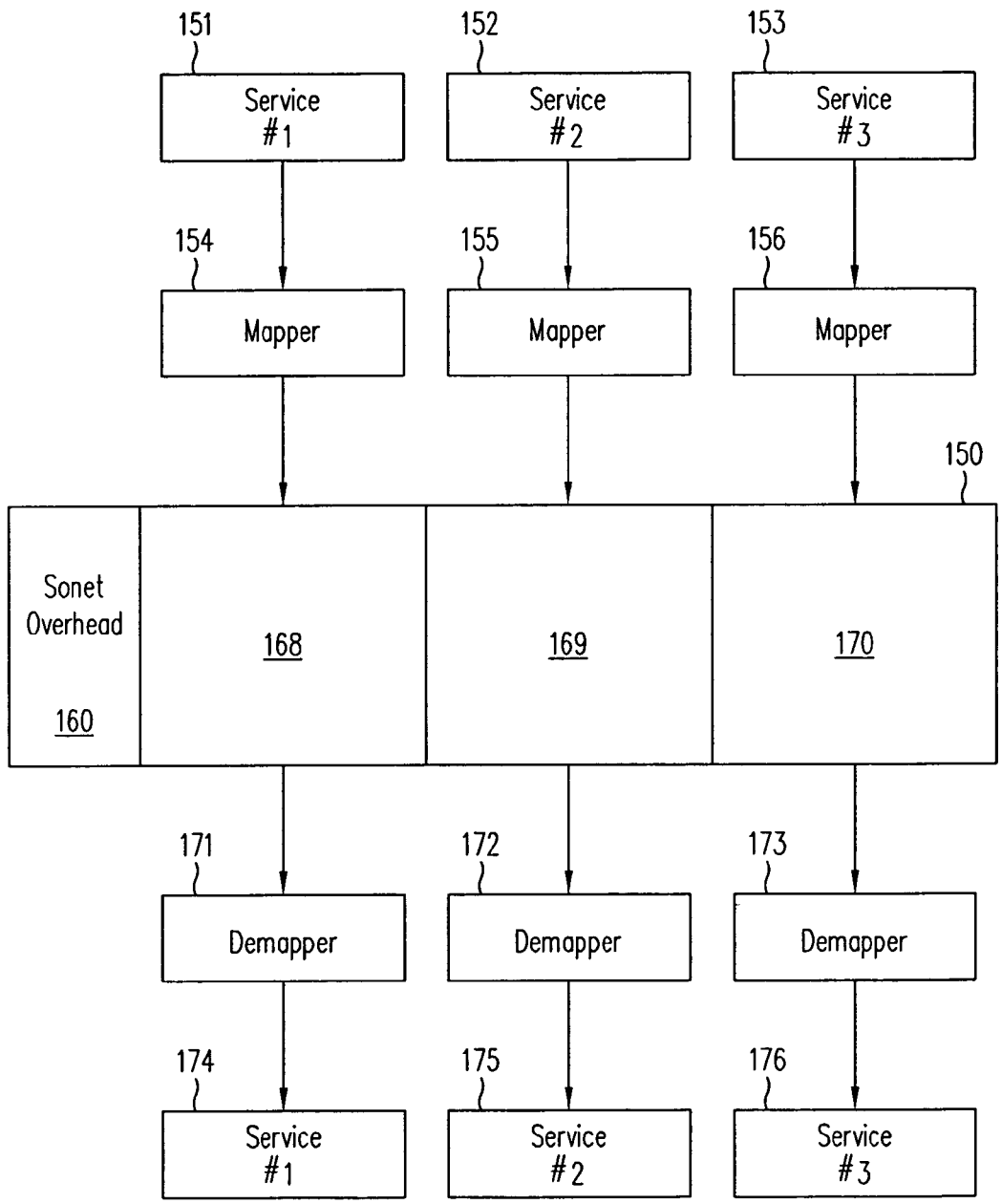
FIG. 1C is a prior art block diagram of a SONET/SDH communication system.
Figure 2:
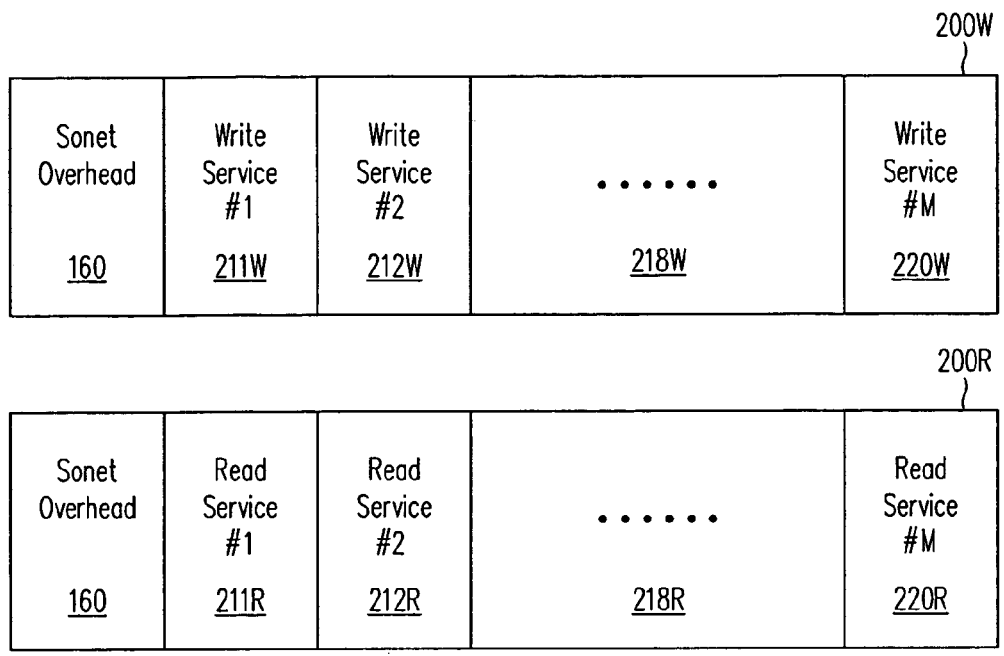
FIG. 2 is an exemplary diagram of provisioning the SONET/SDH bandwidth for the present invention.

The present invention includes a method and apparatus for transporting data from multiple services simultaneously over SONET/SDH devices. In the present invention, the total SONET/SDH bandwidth is shared among different services. Bandwidth is provisioned (i.e. selected in a predetermined manner) for each given service and may vary from the smallest bandwidth service in SONET/SDH to the highest bandwidth service at full SONET/SDH line rates. For example referring to FIG. 2, the total SONET bandwidth 200 for M services is provisioned into Service #1 bandwidth 211, Service #2 bandwidth 212, other services bandwidth 218, and Service #N bandwidth 220. If it is desired that the type of services vary having different bandwidth requirements, the SONET/SDH bandwidth can be reprovisioned with new provisioning information. The SONET Overhead bandwidth 160 varies with the type of frame structure but is fixed by the SONET specification.

Figure 3:
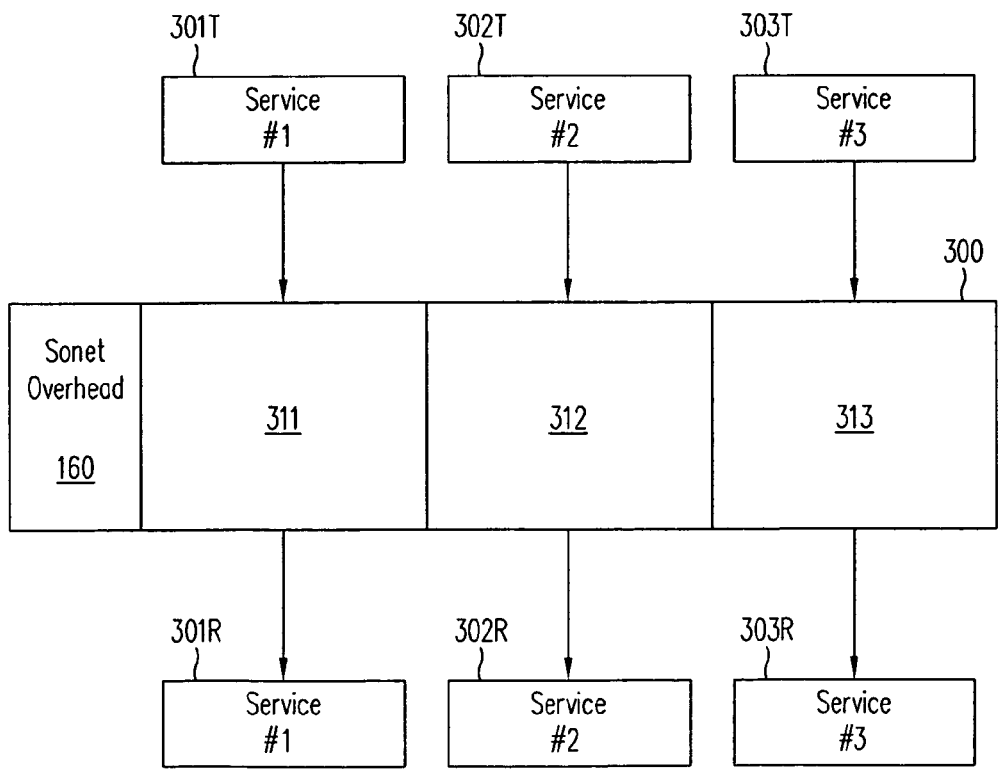
FIG. 3 is a block diagram of a SONET/SDH communication system utilizing the present invention.

Referring to FIG. 3, an example of the method of transmission and reception of SONET/SDH for three services is diagrammed but is not intended to be limiting. While generally the services receiving information are the same as the services transmitting information, they may be different as depicted by FIG. 3. Transmit Service #1 301T, Transmit Service #2 302T, and Transmit Service #3 303T, are the respective services transmitting information while Receive Service #1 301R, Receive Service #2 302R, and Receive Service #3 303R are the respective services receiving information.

Total SONET/SDH bandwidth 200 is provisioned into SONET Overhead bandwidth 160, Service #1 bandwidth (e.g. voice) 311, Service #2 bandwidth (e.g. video) 312, and Service #3 bandwidth (e.g. data) 313. In this manner portions of the SONET/SDH bandwidth is dedicated for each service. This represents the provisioning information for a particular communication configuration but can be varied for other types of communication configurations.

In the present invention, the data format for each service is accommodated in its native format within the SONET/SDH payload. This eliminates the use of the mapping and demapping functions performed respectively by the prior art mappers 154-156 and demappers 171-173. There is no need to convert data from one format into another. For example, consider a service being an Asynchronous Transfer Mode (ATM) service using ATM cells. The ATM cells do not need to be framed into a SONET envelope before it is mapped into the SONET/SDH data stream. The present invention can automatically map the ATM cells into pre-provisioned SONET/SDH envelopes. As another example, consider a packet data service. Packet data can be automatically mapped by the present invention into pre-provisioned SONET/SDH envelopes without any format conversion, such as conversion into ATM cells required by the prior art.

When transmitting SONET/SDH, the present invention uses provisioning information to automatically insert information from a corresponding service at appropriate time slots within the SONET/SDH data stream. When receiving SONET/SDH, the present invention uses provisioning information to recover and segregate information embedded within the SONET/SDH data stream for each service.

Figure 4A:
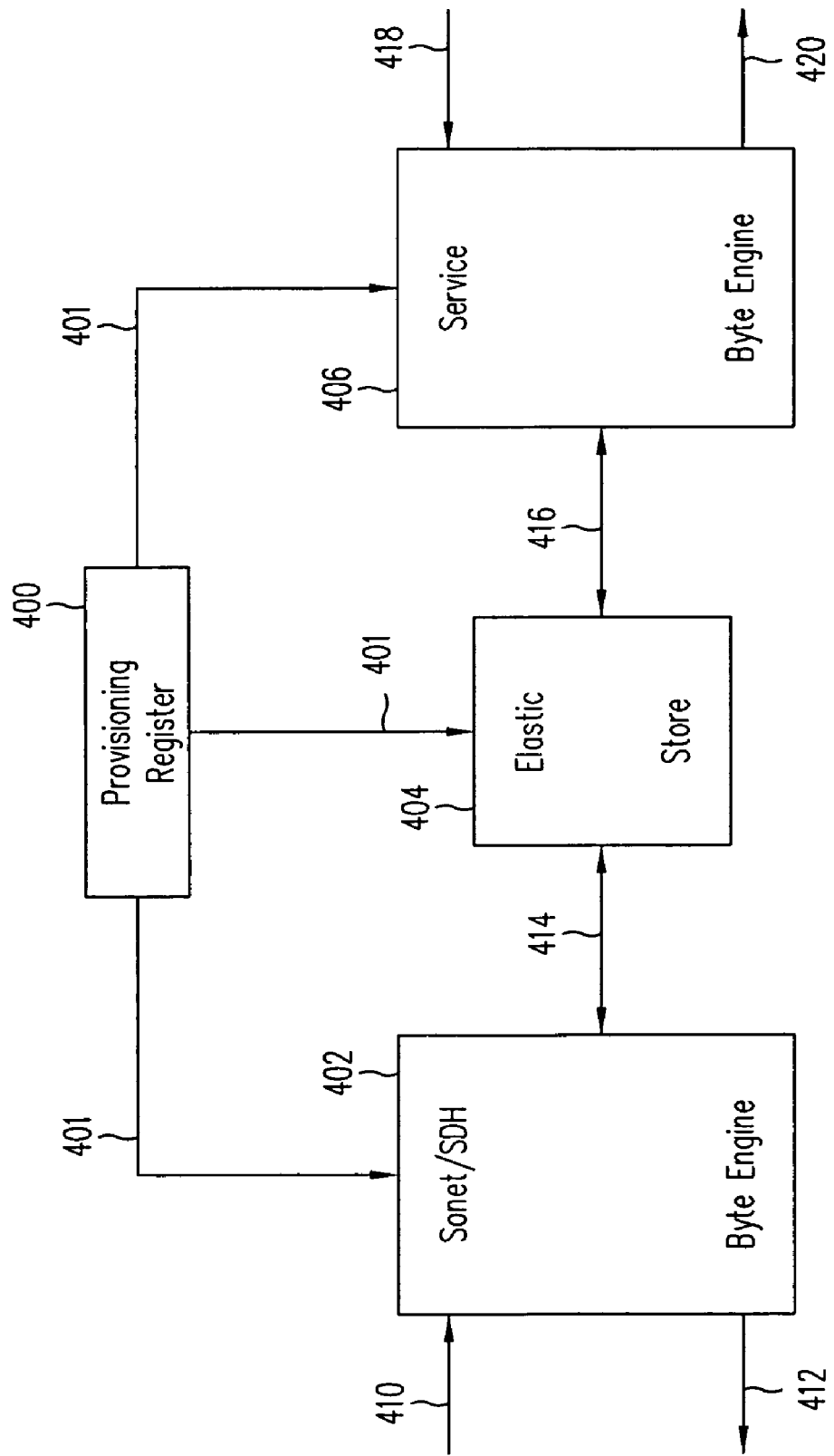
FIG. 4A is a block diagram of the SONET/SDH universal framer (SURF) of the present invention.

FIG. 4 illustrates a block diagram of the SONET/SDH universal framer (SURF). The SONET/SDH universal framer includes a provisioning register 400, a SONET/SDH byte engine 402, an elastic storage means 404, and a service byte engine 406. The provisioning register 400 communicates provisioning information 401 about the communication configuration to the SONET/SDH byte engine 402, the elastic storage means 404, and the service byte engine 406. The provisioning information provisions a SONET/SDH frame into provisioned containers. The provisioned containers are for carrying each service of the multiple services in their own native data format.

The SONET/SDH byte engine 402 receives and transmits SONET/SDH frames of data and reads and stores information from or to the elastic storage means 404. The SONET/SDH frames of data received or transmitted by the SURF over the SONET/SDH communication system have SPE payloads containing services data for transmission to or which were received from the service communication systems coupled to the SURF.

The service byte engine 406 receives and transmits various types of services data in various formats for the various types of services. Additionally the service byte engine 406 reads and stores information from or to the elastic storage means 404. The various types of services data in their native data format is mapped by the SURF into the provisioned containers of the SONET/SDH SPE in order to complete a SONET/SDH payload. That is, raw services data is not transformed into differing data nor is its format destroyed. The services data in its native data format is merely placed (i.e. mapped) into variable size containers within an SPE of a SONET STS-N frame.

The SURF also receives SONET/SDH frames from the SONET/SDH communication system or network that are destined to be communicated to one or more of the multiple services coupled to the SURF. The SONET/SDH frames have SONET/SDH SPE payloads that have been packaged for communication by devices on the SONET/SDH communication network. The SONET/SDH SPE payloads have service data in its native data format which was generated by the network, referred to as network data, for communication to the multiple services. The SURF receives the SONET/SDH frames and demaps the SONET/SDH SPE payload in response to the provisioning information setting up the provisioned containers or SONET bandwidth. The demapped network data is in the native data format type for the according service that the network data is destined. The SURF finally transmits the data to each according service of the multiple services to which the network data is destined. In this manner services data in their native data formats received from the multiple services may be communicated to the SONET/SDH communication network using SONET/SDH payloads and services data from the SONET/SDH communication system or network data contained within SONET/SDH SPE payloads in the services native data format is communicated to the respective service of the multiple services coupled to the SURF.

Figure 4B:
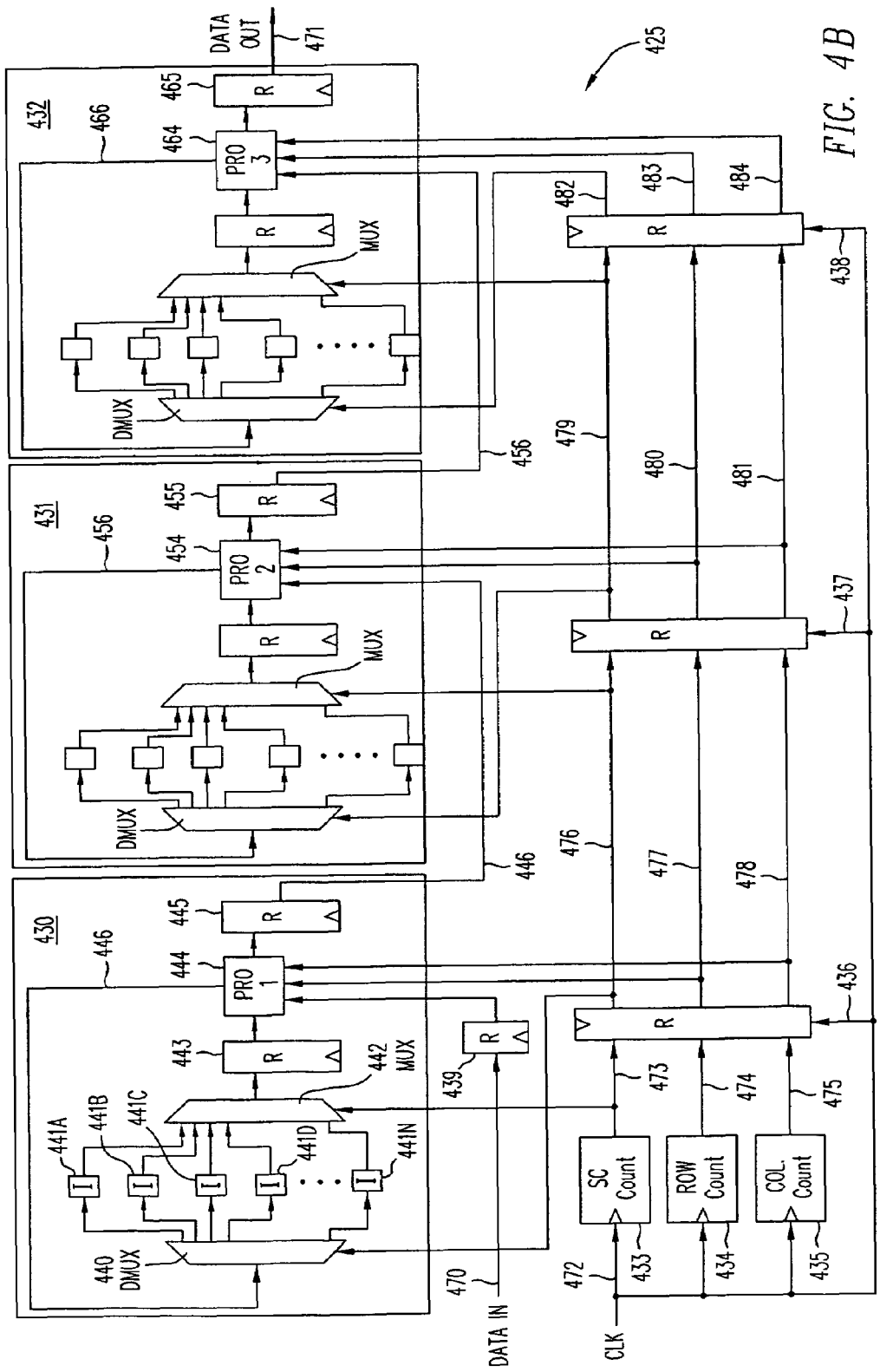
FIG. 4B is a block diagram of a generic byte engine of the present invention.

The SONET/SDH byte engine 402 and the service byte engine 406 are generic processing elements for flow processing and flow control that can process the various hierarchical levels of SONET/SDH frames which are organized into bytes. Referring to FIG. 4B, a generic byte engine 425 is illustrated for processing an array of bytes which are transmitted over a communication system, preferably the array of bytes are in an STS-N frame structure format, having a row, column, and subcolumn values associated with the given array of bytes. The generic byte engine 425 includes at least one processing stage. FIG. 4B illustrates three processing stages 430-432. The generic byte engine 425 further includes counters 433-435, and registers 436-439. Each processing stage 430-432 has similar components excluding the processing element which performs specific tasks on data. Processing stages 430-432 respectively have processing elements 444, 454, and 464 to perform differing tasks on the bytes of data. Processing stage 430 is now described in detail with the understanding that processing stages 430-432 are similar excepting the processing elements 444, 454, and 464. Processing stage 430 includes a de-multiplexor 440, a storage means 441 having N storage memory locations 441A-441N, a multiplexor 442, a register 443, the processing element 444, and a register 445. Storage means 441 is preferably a set of N registers where each register has the capability of storing an intermediate state of the processing element. An intermediate state is a group of bytes for a given processing element. The set of N registers is capable of storing a set of N intermediate states for a given processing element. Alternatively storage means 441 is a dual port memory with a read and write port having N storage memory location 441A-441N each capable of storing a set of N intermediate states of each processing element. The read port and the write port of the dual port memory can respectively substitute for the demultiplexor 440 and the multiplexor 442. Data is input into the generic byte engine 425 over data-in 470 and is output from the generic byte engine 425 at data-out 471. Input data on data-in 470 is registered by register 439 to synchronize the processing of data at processing element 444. A clock is used to synchronize the processing within the byte engine 425 and is routed over clock line 472 throughout the byte engine including to the registers, the storage memory locations and to the counters 433-435. The subcolumn count value is output from subcolumn counter 433 on line 473. The row count value is output from row counter 434 on line 474. The column count value is output from column counter 435 on line 475. The subcolumn counter 433, the row counter 434 and the column counter 435 have their respective count value outputs on lines 473-475 registered by register 436 to synchronize the processing within the byte engine and to respectively generate registered count value signals on lines 476-478 for synchronization. The subcolumn counter 433 has its count value output coupled to the multiplexor 442 to preselect the intermediate state for input into the processing element 444. Multiplexor 442 selects the intermediate state stored within the N storage memory locations 441A-441N for restoration. The output of multiplexor 442 is coupled to register 443 to hold the intermediate state for synchronization and for processing in the processing element 444. After processing is complete a new intermediate state is saved back into the N storage memory locations 441-441N by the de-multiplexor 440. Line 476, the registered subcolumn count value, is coupled to the de-multiplexor 440 for selection of one of the N storage memory locations 441A-441N into which to store the new intermediate state. In this manner the count value within the subcolumn counter 433 selects one of the N storage memory locations 441A-441N so that an intermediate state can be restored, processed, and saved within stage 430 of the byte engine 425. Lines 477 and 478 couple to the processing element 444 of stage 430 in order to properly control and process the data for the associated location within the array of bytes. The output from the processing element 444 is coupled to register 445 so that it can be used by the next stage, or in the case of the third stage 432 or otherwise final processing stage, register 465 outputs the output data of the byte engine on data-out 471. Lines 476-478 are registered by register 437 to respectively generate registered count value signals on lines 479-481 for synchronization. For the processing stage 431, line 476 is coupled to multiplexor 452 and line 479 is coupled to demultiplexor 450 for proper selection of one of the N intermediate states for restoring, processing, and saving the selected intermediate state at the appropriate time. Lines 479-481 are registered by register 438 to respectively generate registered count value signals on lines 482-484 for synchronization. For processing stage 432, line 479 is coupled to multiplexor 462 and line 482 is coupled to demultiplexor 460 for proper selection of one of the N intermediate states for restoring, processing, and saving the selected intermediate state at the appropriate time. The output 446 of register 445 in the processing stage 430 is coupled to the processing element 454 of processing stage 431 in order for data to flow to the next processing stage. The output 456 of register 455 of processing stage 431 is coupled to the processing element 464 of processing stage 432 in order for data to flow to the next processing stage. Processing element 464 is coupled to register 465 which registers the final processed data and generates the final output data of the byte engine 425 on data-out 471.

A SONET byte engine works with a set of "N" intermediate states corresponding to each of the N equivalent STS-1 frames within an STS-N frame using a single unified processing engine. This contrasts with existing mechanisms for generating or receiving an STS-N frame where there are "N" processing engines, one for each equivalent STS-1 frame. The SONET byte engine processes an STS-N frame in the following manner using the byte engine components previously described. The row counter counts values from one through nine which corresponds to the nine rows of an STS-1 equivalent frame within the STS-N frame. The column counter counts ninety times representing the values from one through ninety corresponding to the ninety columns of an STS-1 equivalent frame within the STS-N frame. The subcolumn counter counts N times representing the values from one through N which corresponds with the N equivalent STS-1 frames within the STS-N frame. A controller within the byte engine establishes an array of N intermediate states for the control of the byte engine which corresponds to the N equivalent STS-1 frames within the STS-N frame. The provisioning register 400 has information describing the predetermined value N such that the byte engine control corresponds to the N equivalent STS-1 frames within the STS-N frame.

Figure 4C:
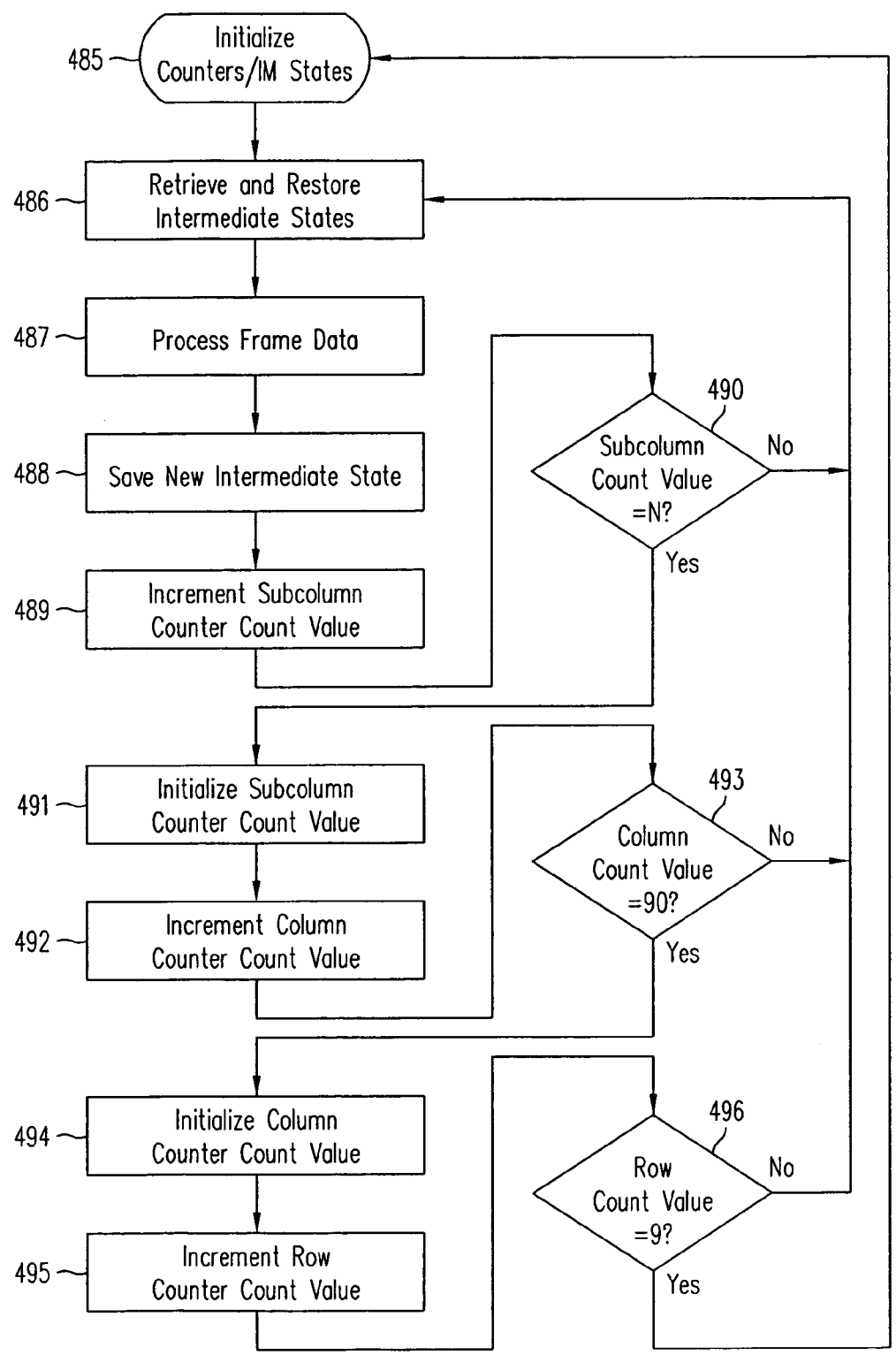
FIG. 4C is a flow chart of the steps for processing an array of data by a processing stage of the generic byte engine of FIG. 4B.

Referring to FIG. 4C, the processing steps of the SONET byte engine are now described for processing an STS-N frame. At step 485 the row, column and subcolumn counters are initialized to an initial count value such as 1 representing the start of one of N STS-1 equivalent frames. The intermediate states for the byte engine may be initialized as well but is not required if they are ignored on the first processing cycle. At step 486, the intermediate state of the byte engine is retrieved and restored. At step 487, frame data is processed by the processor. The row and column counters determine whether SOH, LOH, POH or the payload data (SPE) of the frame is processed. The provisioning information from the provisioning register 400 is used to map the appropriate service data into the payload, if the row and column counters dictate that a payload data is to be processed in the given STS-1 equivalent frame. At step 488, the intermediate state of the process is stored which corresponds to one of the N intermediates states. The subcolumn counter value indicates the saved intermediate state for each N equivalent STS-1 frame within the STS-N frame being processed. At step 489 the subcolumn counter value is incremented to the next count value for the next equivalent STS-1 frame within the STS-N frame. At step 490, a determination is made as to whether all N equivalent STS-1 frames have been processed for a given row and column location. This is performed by analyzing the subcolumn counter value. If the subcolumn counter has counted N times (i.e. subcolumn counter value=N) then the process moves to step 491. If the subcolumn counter has not counted N times, then the process returns to step 486 and repeats steps 486 through 490. At step 491, the subcolumn counter is initialized once again to its initial value such as one.

At step 492, the column counter is incremented. At step 493, a determination is made as to whether all ninety columns of each equivalent STS-1 frame for a given row of an STS-N frame have been processed. This is performed by analyzing the column counter value. If the column counter has counted ninety times (i.e. column counter value=90) then the process moves to step 494. If the column counter has not counted ninety times, then the process returns to step 486 and repeats steps 486 through 493. At step 494, the column counter is initialized once again to its initial value such as one. At step 495, the row counter is incremented. At step 496, a determination is made as to whether all nine rows of an STS-N frame have been processed. This is performed by analyzing the row counter value. If the row counter has counted nine times (i.e. row counter value=9) then the process moves to step 485 to process the next STS-N frame. In this case the processing of one STS-N frame with N equivalent STS-1 frames is completed and processing of the next STS-N frame begins. If the row counter has not counted nine times, then the process returns to step 486 and repeats steps 486 through 496 until processing of a given STS-N frame is completed.

In this manner, the SONET/SDH byte engine 402 and the service byte engine 406, with the appropriate stages, process information a byte at a time in relationship to an SONET STS-1 frame structure 100. For an STS-N frame structure 105 or STS-Nc frame structure, the SONET/SDH byte engine 402 and the service byte engine 406 process information a byte at a time in each of the interleaved or multiplexed N equivalent STS-1 frames reading and writing data from or to the elastic storage means 404 as necessary. The SONET/SDH byte engine 402 processes bytes within a given column of a given row for each one of N equivalent STS-1 frames and then processes the next column within the given row and then further processes an STS-N frame structure in a row by row sequence from the first row to the ninth row. In order to process the STS-N frame, intermediate states of the SONET/SDH byte engine are restored, processed, and saved for each given SONET STS-1 frame of the STS-N frame structure in order to process the next byte or column of a different STS-1 frame. In order to process M streams for each given service type, the intermediate states for each stream M are restored, processed and then saved in each cycle of processing of a given type of service stream by the service byte engine 406. In this manner, the SONET/SDH byte engine 402 and the service byte engine 406 can use the same hardware to process an STS-1 frame or any higher level frame such as an STS-N frame. The intermediate states of the byte engines are restored, processed, and saved into registers or other memory storage means.

The provisioning register 400 is a register for storing provisioning information 401 that describes the desired communication configuration for the communication system where the present invention is utilized. For the SONET/SDH stream of information the provisioning register 400 contains information about the type of SONET/SDH frames that are to be received and transmitted and whether various types of SONET frames are to be contained within a higher level of SONET frame (i.e. the value of N for an STS-N frame structure). For the service stream of information, the provisioning register 400 contains the service stream number and the type of data traffic or communication service (e.g. DS3, Telecom, Asynchronous Transfer Mode (ATM), Packets, unequipped, etc.) that will be transmitted or received for a given service stream number M. Knowing the type of data traffic and the total number of service streams, and the SONET frame type, the total bandwidth of the SONET stream can be allocated properly or provisioned to the given service stream numbers by the SONET/SDH byte engine 402 and the service byte engine 406. In this manner the service data can be containerized into the payload of a SONET frame similar to packages being placed into containers for shipment on a truck. The provisioning register 400 is preferably a separate register or some other storage means for storing information describing the desired communication configuration of the communication system. Because the provisioning register 400 is reprogrammable, the SONET/SDH bandwidth can be reprovisioned by storing new provisioning information into the provisioning register 400.

The elastic storage means 404 may be registers or memory that is reconfigurable by the provisioning information stored within the provisioning register 400. The elastic storage means 404 is used to de-couple the SONET byte engine from the service byte engine whereby they can operate independently from each other. The elastic storage means 404 temporarily stores the payload information of a SONET/SDH data stream that is being processed after it has been received or for which it is being processed for framing and transmission into the SONET/SDH data stream. This payload information stored within the elastic storage means 404 may also be read or written by the service byte engine 406 representing the information for transmission or reception to/from the various services. Based on the provisioning information, the operation of the elastic storage means 404 such as the amount of storage needed and the locations of storing data varies.

Figure 5:
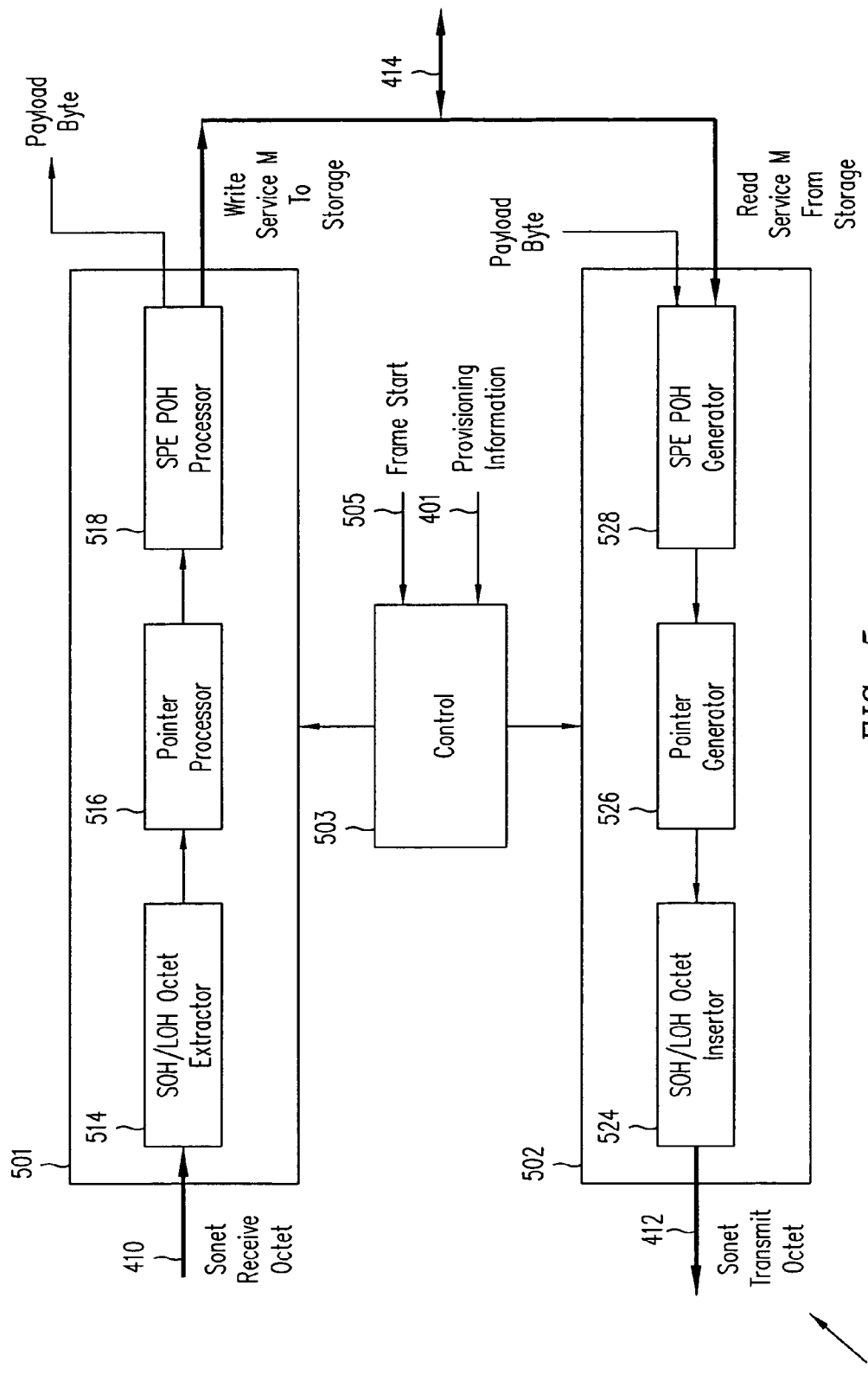
FIG. 5 is a block diagram of the SONET/SDH transmit and receive byte engines of the present invention.

FIG. 5 illustrates a block diagram of the SONET/SDH byte engine 402 which includes a SONET/SDH receive byte engine 501, a SONET/SDH transmit byte engine 502, and a control means 503. The SONET/SDH receive byte engine 501 includes three processing stages, an SOH/LOH octet extraction stage 514, a pointer processor stage 516, and an SPE POH processor stage 518. The SONET/SDH transmit byte engine 502 includes three processing stages, an SOH/LOH Octet Insertion stage 524, a Pointer generator stage 526, and an SPE POH generator stage 528.

The SONET/SDH receive byte engine 501 receives the SONET/SDH octet stream over the SONET/SDH receive port 410, demultiplexes overhead octets and payload octets, and processes the overhead bytes and flags any abnormalities. Control means 503 which controls the stages of the receive byte engine 501 is triggered by frame start signal 505. Control means 503 includes a row counter, a column counter, a sub-column counter, and for the receive byte engine 501. Frame start signal 505 when received initializes the row counter, column counter, and sub-column counter to their respective initial count values. Sub-column counter counts to the value N for a given STS-N SONET stream of data. Column counter counts to the value of 90 and the row counter counts to a value of 9 as per the SONET standard. At each stage of the receive byte engine 501, the provisioning information 401, and the counts within the row counter, column counter, and sub-column counter for the receive byte engine 501 are used to control the data flow within the receive byte engine 501 and generate an intermediate state. Control signals for each stage of the receive byte engine 501 are generated using information from the row counter, column counter, and sub-column counter receive byte engine 501, the provisioning information 401, and the intermediate states.

The SOH/LOH octet extraction stage 514 of the receive byte engine 501 accepts the received byte-aligned bytes from the SONET/SDH receive port 410 and extracts the section overhead (SOH) and the line overhead (LOH). It further checks and flags any Section bit-interleaved parity (BIP) errors (B1), and checks and flags any Line Overhead BIP errors (B2) and flags any section and line level alarms. The extraction stage 514 also extracts the pointer bytes (H1, H2) from the LOH. For each STS-1 equivalent of the STS-N framed processes, the data-bits of the intermediate state for the extraction stage 514 that are restored, processed, and saved are the previous and current Section BIP byte (B1), the previous SPE pointer, the pointer adjustment required whether to increment or decrement, the New Data Flag, the history for the stability of a new pointer, and a Temporary New Pointer.

The pointer processor stage 516 of the receive byte engine 501 interprets the pointer and identifies the SPE payload start and path overhead bytes from the pointer bytes (H1, H2). Pointer processor stage 516 processes the LOH for pointer interpretation and determines how to generate a new pointer. In generation of a new pointer, the pointer processor stage 516 initializes the pointer value with the received H1 and H2 bytes or it uses the current pointer value and further determines whether to increment, decrement or provide no adjustment to the pointer value. For byte engine processing the Intermediate States of the pointer processor stage 516 are restored, processed, and saved. For each STS-1 equivalent of the STS-N framed processes, the data-bits of the intermediate state of the processor stage 516 that are restored, processed, and saved are the SPE Start Column number for each N equivalent STS-1 frame and the SPE Start Row number for each N equivalent STS-1 frame.

The SPE POH processor stage 518 of the receive byte engine 501 extracts and processes the path overhead (POH) bytes. The receive byte engine may optionally write the path overhead bytes to the elastic storage means 404 for each of the services. The SPE POH processor stage 518 furthermore flags the start of the SPE. The SPE POH processor stage 518 also processes the payload using the STS Path Signal Label (C2) so that the data for the multiple services can be extracted and written into the elastic storage means 404 over the storage port 414. The SPE POH processor stage 518 further asserts the proper control signals to the elastic storage means so that data is available for further processing downstream. For byte engine processing the Intermediate States of the SPE POH processor stage 518 are restored, processed, and saved. For each STS-1 equivalent of the STS-N framed processes, the data-bits of the intermediate state that are restored, processed, and saved are the previous and current SPE Path bit interleaved parity (BIP) (B3) byte, the STS Path signal Label (C2), and the STS Path Trace (J1) byte.

The SONET/SDH transmit byte engine 502 reads service data from the elastic storage means 404, multiplexes and transmits the generated overhead and the received payload octets into a single octet stream, and outputs the SONET/SDH octets over the SONET/SDH transmit port 412. Control means 503 which controls the stages of the transmit byte engine 502 is triggered by frame start signal 505. Control means 503 includes a row counter, a column counter, and a sub-column counter for the transmit byte engine 502. Frame start signal 505 when received initializes the row counter, column counter, and sub-column counter to their respective initial count values. Sub-column counter counts to the value N for a given STS-N SONET stream of data. Column counter counts to the value of 90 and the row counter counts to a value of 9 to meet the SONET standard. At each stage of the transmit byte engine 502, the provisioning information 401, and the counts within the row counter, column counter and sub-column counter for the transmit byte engine 502 are used to control the data flow within the transmit byte engine 501 and generate an intermediate state. Control signals for each stage of the transmit byte engine 502 are generated using information from the row counter, column counter, and sub-column counter for the transmit byte engine 502, the provisioning information 401, and the intermediate states.

The SPE POH generator stage 528 of the SONET/SDH transmit byte engine 502 reads the appropriate service data from the elastic storage means 404 over the bi-directional storage port 414. It processes the service data and generates the path overhead (POH) bytes for each given service. In the case of packets, ATM cells, or DS3 services the POH is internally generated by the SPE POH generator stage 528. In the case of telecom service, the POH is either generated by the SPE POH generator stage 528 or it is inherently provided by the telecom service The column of POH bytes are inserted at the appropriate moment in the SPE of a SONET frame. Of the POH bytes, the SPE POH generator stage 528 inserts the corresponding STS Path Signal Label (C2) and the Path BIP-8 (B3) field at the appropriate moment. Additionally, the SPE POH generator stage 528 appropriately signals read enable to the controller 503 that payload data is ready for additional processing downstream. For byte engine processing the Intermediate States of the SPE POH generator stage 528 are restored, processed, and saved. The data-bits of the intermediate state that are restored, processed, and saved are the previous and current SPE Path bit interleaved parity (BIP) (B3) byte, the STS Path signal Label (C2), and the STS Path Trace (J1) byte.

The Pointer generator stage 526 of the SONET/SDH transmit byte engine 502 is coupled to the SPE POH generator stage 528. The pointer generator stage 526 identifies the SPE payload beginning and the path overhead (POH) bytes and generates a new pointer. In generation of a new pointer, the pointer generator stage 526 initializes the pointer value with the received H1 and H2 bytes or it uses the current pointer value and further determines whether to increment, decrement or provide no adjustment to the pointer value For byte engine processing the Intermediate States of the pointer generator stage 526 are restored, processed, and saved. The data-bits of the intermediate state that are restored, processed, and saved are the SPE Start Column number for each N equivalent STS-1 frame and the SPE Start Row number for each N equivalent STS-1 frame.

The SOH/LOH Octet Insertion stage 524 of the SONET/SDH transmit byte engine 502 is coupled to the Pointer generator stage 526. The insertion stage 524 generates certain bytes of the section overhead (SOH) and the line overhead (LOH) and inserts them into the appropriate SONET frame location for a given SONET frame structure. The insertion stage 514 generates the automatic protection switching (APS) bytes K1 and K2 and inserts them into the appropriate SONET frame location as part of the LOH. The insertion stage 524 generates the pointer bytes (H1, H2) of the LOH based on the pointer information received from the pointer generator stage 526 and the provisional information 401. The insertion stage 524 generates the parity bytes Section bit-interleaved parity (BIP) error byte (B1) and Line Overhead BIP error byte (B2) and inserts them into the appropriate SOH and LOH locations of a given SONET frame structure. The insertion stage 524 further outputs the SONET/SDH bytes out through the SONET transmit port 412. For byte engine processing the Intermediate States of the SOH/LOH Insertor stage 524 are restored, processed, and saved. The data-bits of the intermediate state that are restored, processed, and saved are the previous and current Section BIP-8 byte (B1) for an STS-N frame, the previous and current Line BIP-8 byte (B2) for each N equivalent STS-1 frame (i.e., STS-1 has one set of previous and current B2 bytes, STS-3 has three sets of previous and current B2 bytes, and STS-N has N sets of previous and current B2 bytes as data-bits for the N intermediate states), the previous SPE pointer for each N equivalent STS-1 frame, the previous SPE Pointer for each N equivalent STS-1 frame, and the history for the stability of the new pointer for each N equivalent STS-1 frame.

FIGS. 6A-6E illustrate block diagrams comprising the service byte engine 406 which includes service add byte engines 601, 621, 641, 661, and 681, service drop byte engines 602, 622, 642, 662, and 682, and control means 603. Except for the Telecom service add and drop byte engines 601 and 602, each of the service add and drop byte engines can interface to M multiple streams for reading or writing of data of the same service type. As the service add and drop byte engines change from processing one stream of data to another, the intermediate states of the byte engine are restored, processed, and saved so that it can return to processing the next byte for the same stream of data when it returns to processing said stream. Each of the service add and drop byte engines writes and reads data into/from the elastic storage means 404 through the service data storage port 416.

Figure 6A:
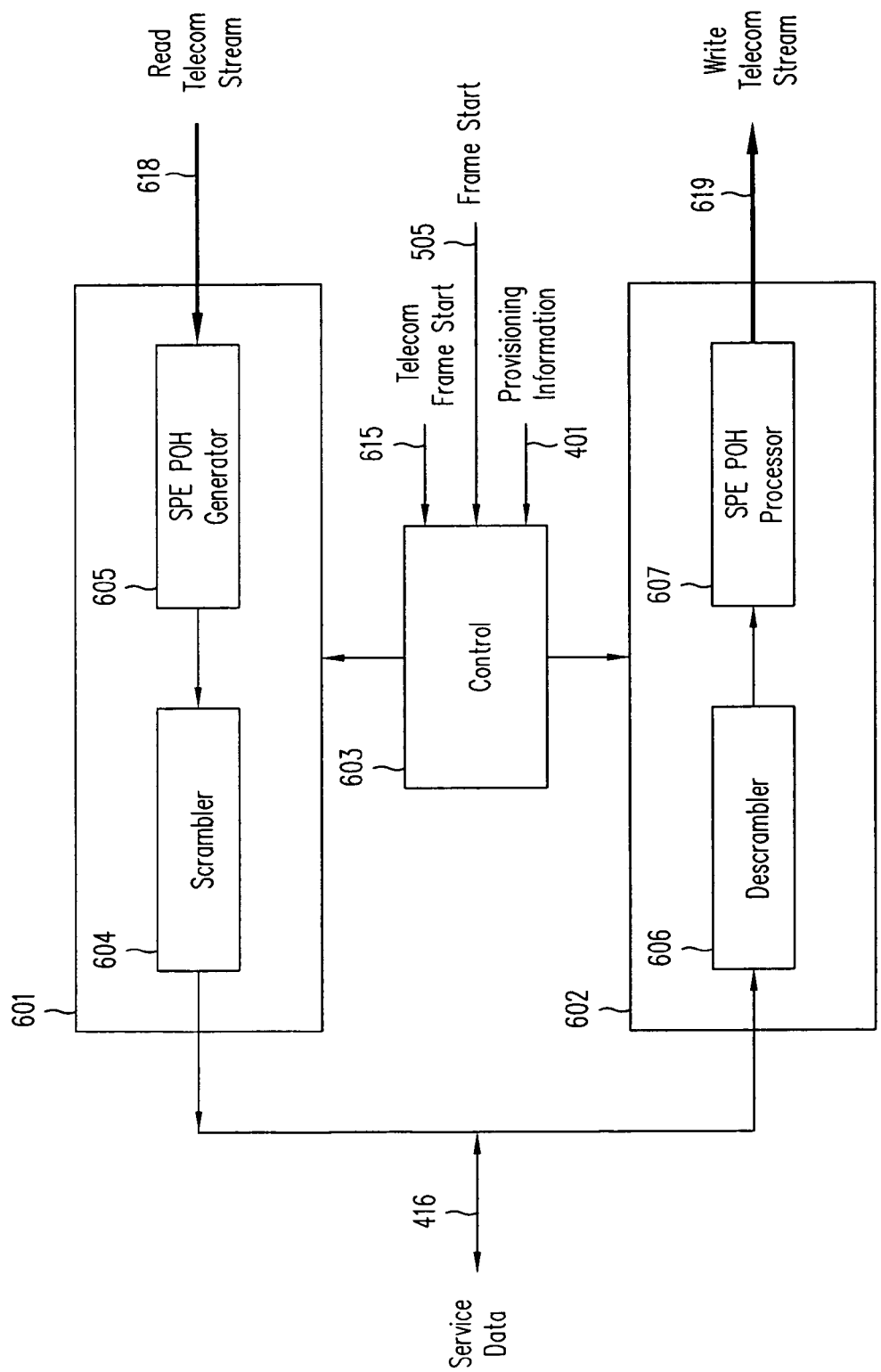
FIG. 6A is a block diagram of the services receive and transmit byte engines of the present invention for telecom services.

Referring to FIG. 6A, the Telecom service add byte engine 601 and the Telecom service drop byte engine 602 support Telecom services and can interface with M streams of Telecom data. The Telecom service add byte engine 601 and the Telecom service drop byte engine 602 are respectively similar in operation to the SONET/SDH transmit byte engine 502 and the SONET/SDH receive byte engine 501 of the SONET/SDH byte engine 402 but have less complex processing. Control means 603 controls the operation of the Telecom service add and drop byte engines 601, 602.

The Telecom service add byte engine 601 includes a SPE POH generator stage 605 and a scrambler stage 604. The SPE POH generator stage 605 generates the Path overhead (POH) bytes and includes it within the Telecom framed data to generate the SPE payload. The byte engine 601 does not need Line Overhead because the payload between the Telecom data and the SONET/SDH STS-1 frame are similar and their timing is synchronized by the Telecom Frame Start signal 615 and the frame start signal 505. Because of this the Line Overhead is set to null bits (i.e., a don't care state) for Telecom service. The scrambler stage 604 scrambles the Telecom data so to increase the probability that their is an equal density in the number of transitions in the data stream. The scrambler stage 604 is a standardized frame synchronous scrambler of sequence length 127 operating at the line rate. The generating polynomial for the scrambler is $1+x^6+x^7$. The scrambler is reset to 1111111 on the most significant bit of the byte following the Z0 byte in the Nth STS-1 frame. The scrambler 604 operates further in accordance with the SONET specification. For byte engine processing the Intermediate States of the SPE POH generator stage 605 are restored, processed, and saved. The data-bits of the intermediate state that are restored, processed, and saved are the previous and current SPE Path bit interleaved parity (BIP) (B3) byte, the STS Path signal Label (C2), and the STS Path Trace (J1) byte.

The Telecom service drop byte engine 602 includes a descrambler stage 606 and a SPE POH Processor stage 607. The descrambler stage 606 descrambles the SPE and recovers the original payload data. The descrambler stage 606 operates further in accordance with the SONET specification. The SPE POH Processor stage 607 removes the payload overhead bytes and generates the stream of Telecom data for delivery to the Telecom service over the write telecom port 619. For byte engine processing the Intermediate States of the SPE POH processor stage 607 are restored, processed, and saved. For each STS-1 equivalent of the STS-N framed processes, the data-bits of the intermediate state that are restored, processed, and saved are the previous and current SPE Path bit interleaved parity (BIP) (B3) byte, the STS Path signal Label (C2), and the STS Path Trace (J1) byte.

Control means 603 provides the control signals that are necessary to process the data flow through the stages of the service add byte engines 601, 621, 641, 661, and 681 and service drop byte engines 602, 622, 642, 662, and 682. Control means 603 accepts the provisioning information 401 from the provisioning register 400, a frame start signal 505 for the SONET/SDH framing and a Telecom frame start signal 615 for the Telecom service. The provisioning information 401 from the provisioning register 400 describes the types of services being used and the number of similar service types within a given communication system. The provisioning register 400 can be rewritten varying provisioning information and the number of streams of data for a given service that are supported. Additionally, the provisioning information 401 describes the types of SONET frame hierarchy being utilized in a given communication system to transport data in SONET format. The frame start signal 505 and Telecom frame start signal 615 allow the control means 603 to properly sequence the data flow into the elastic storage means 404.

Figure 6B:
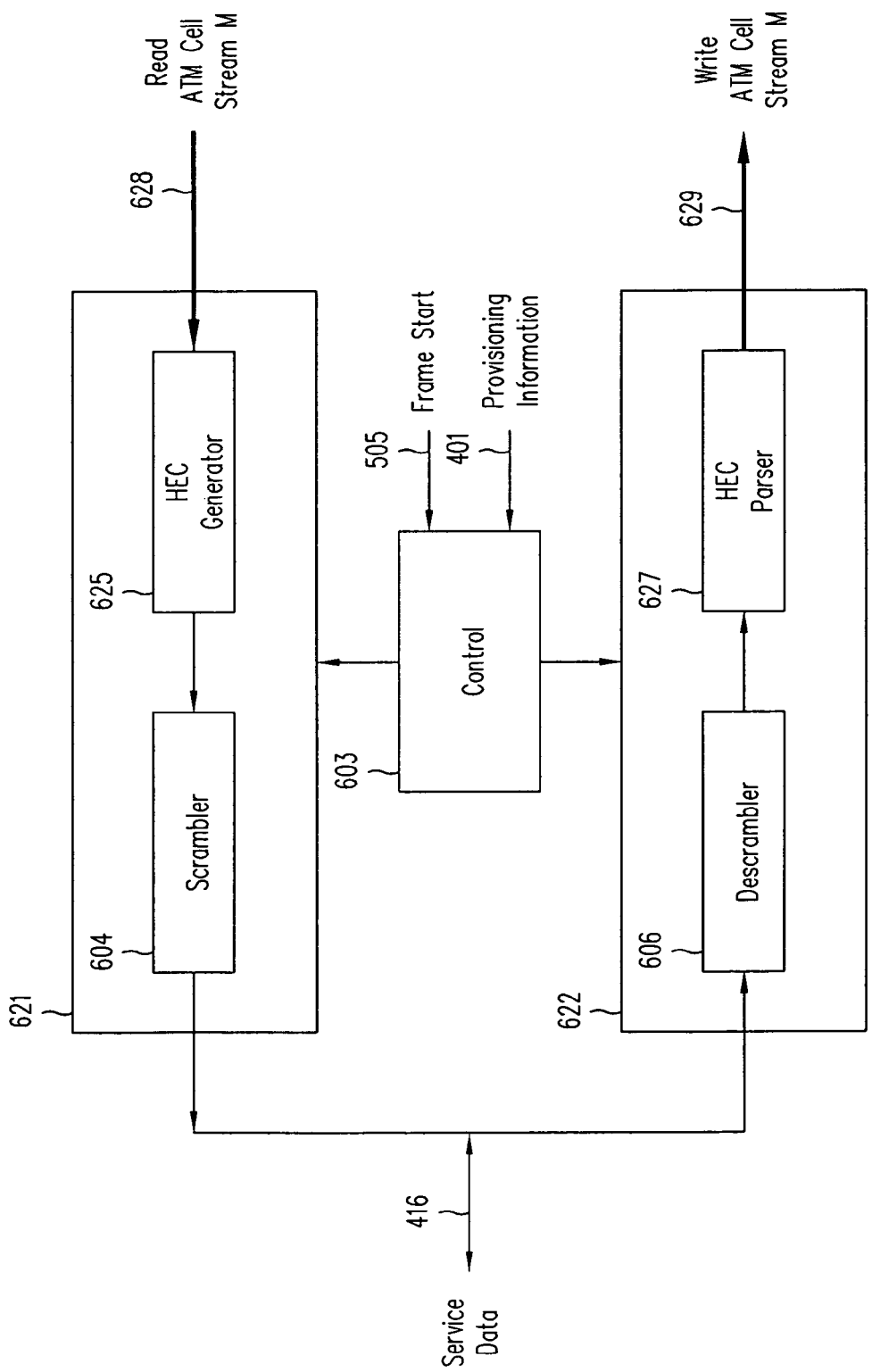
FIG. 6B is a block diagram of the services receive and transmit byte engines of the present invention for ATM Cell services.

Referring to FIG. 6B, the ATM service add byte engine 621 and the ATM service drop byte engine 622 support ATM services and can interface with M streams of ATM cell data. The provisioning register 400 provides provisioning information 401 to the Control means 603 as to how many streams M of ATM cell data to expect in the communication system. The provisioning register 400 can be rewritten varying the number of streams of ATM cell data that are supported. Control means 603 controls the operation of the ATM service add and drop byte engines 621, 622. The ATM service add byte engine 621 includes an HEC generator stage 625 and the scrambler stage 604. The HEC generator stage 625 reads the bytes of ATM cell data from each of the M ATM cell services by way of the read ATM cell stream M port. It further generates the Header Error Check (HEC) bytes for the first four bytes of the header and properly frames the data into the SONET frame. The scrambler stage 604 functions as previously described with respect to the Telecom service add byte engine 601. The data-bits of the intermediate state restored, processed, and saved per stream M for the ATM service add byte engine 621 are the ATM cell byte count, current HEC value, and the state of the scrambler 604. The ATM service drop byte engine 622 includes the descrambler stage 606 and an HEC parser stage 627. The descrambler stage 606 functions as previously described with respect to the Telecom service drop byte engine 602. The HEC parser stage 627 removes the HEC and checks for errors and then demaps the framed data into the various streams of ATM cell data for writing to M ATM cell services by the write ATM cell Stream M port 629. The data-bits of the intermediate state restored, processed, and saved per stream M for the ATM service drop byte engine 622 are the ATM cell byte count, current HEC value, and the state of the descrambler 606.

Figure 6C:
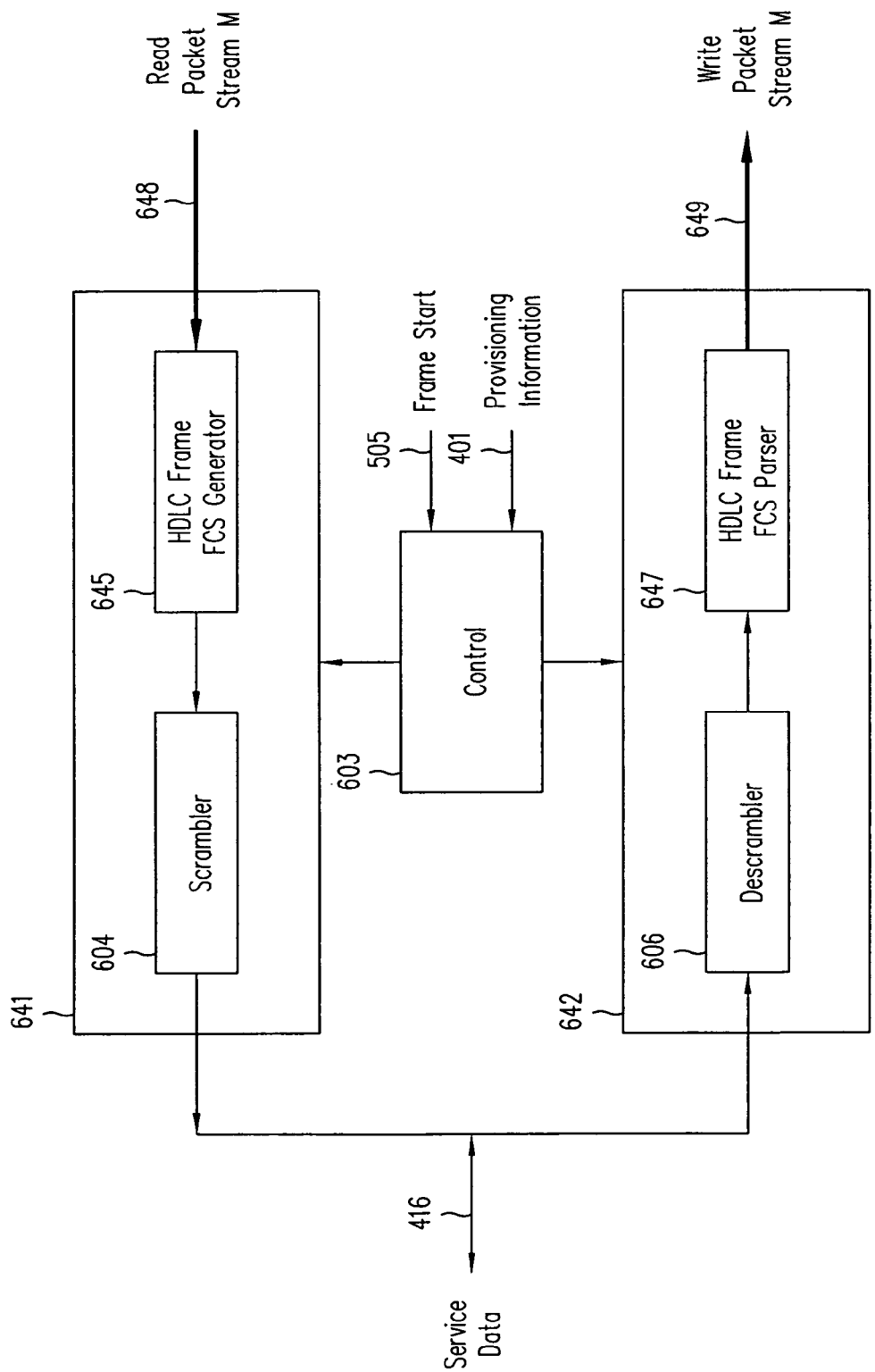
FIG. 6C is a block diagram of the services receive and transmit byte engines of the present invention for Packet services.

Referring to FIG. 6C, the Packet service add byte engine 641 and the Packet service drop byte engine 642 support Packet services and can interface with M streams of ATM cell data. Control means 603 controls the operation of the Packet service add and drop byte engines 641, 642. The Packet service add byte engine 641 includes an HDLC Frame/FCS generator stage 645 and the scrambler stage 604. The HDLC Frame/FCS generator stage 645 adds the required framing and generates FCS. The scrambler stage 604 functions as previously described with respect to the Telecom service add byte engine 601. The data-bits of the intermediate states restored, processed, and saved for each stream M for the Packet service add byte engine 641 are the current byte count for a packet, current FCS value, and the state of the scrambler 604. The Packet service drop byte engine 642 includes the descrambler stage 606 and an HDLC Frame/FCS parser stage 647. The descrambler stage 606 functions as previously described with respect to the Telecom service drop byte engine 602. The HDLC Frame/FCS parser stage 647 removes the FCS and checks for errors and then demaps the framed data into the various streams of Packets for writing to M Packet services by the write Packet Stream M port 649. The data-bits of the intermediate state restored, processed, and saved per stream M for the Packet service drop byte engine 642 are the current byte count for a packet, current FCS value, and the state of the descrambler 606.

Figure 6D:
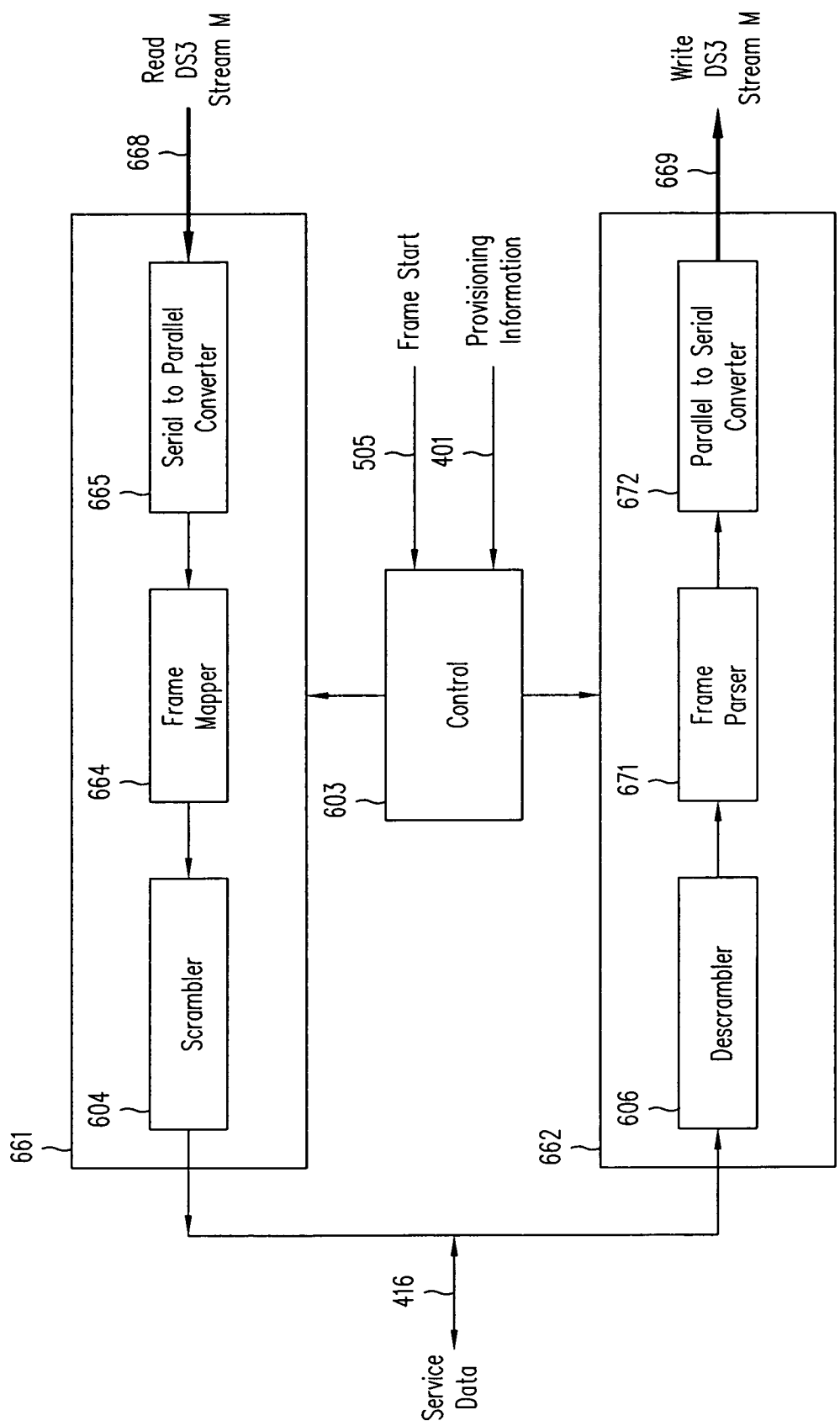
FIG. 6D is a block diagram of the services receive and transmit byte engines of the present invention for DS3 services.

Referring to FIG. 6D, the DS3 service add byte engine 661 and the DS3 service drop byte engine 662 support DS3 services and can interface with M streams of DS3 data. Control means 603 controls the operation of the DS3 service add and drop byte engines 661, 662. The DS3 service add byte engine 661 includes a Serial to Parallel Converter 665, a Frame Mapper stage 664 and the scrambler stage 604. The Serial to Parallel Converter 665 converts the serial stream of bits received over the read DS3 stream M port 668 into parallel bytes of data and stores into the elastic storage means 404. The Frame Mapper stage 664 reads the data out of the elastic storage means 404 and maps the parallel DS3 into an STS-1 frame as per the SONET specification ("Bellcore GR-253 CORE specification") The scrambler stage 604 functions as previously described with respect to the Telecom service add byte engine 601. The data-bits of the intermediate state restored, processed, and saved for each stream M for the DS3 service add byte engine 661 are STS-1 row and column counter for each DS3 stream and a flag describing whether a given row has a stuffed "bit" or not (for stuffing an additional bit of data into a given row of the STS-1 SPE).

The DS3 service drop byte engine 662 includes the descrambler stage 606, a Frame Parser stage 671, and a Parallel to Serial Converter stage 672. The descrambler stage 606 functions as previously described with respect to the Telecom service drop byte engine 602. The Frame Parser stage 671 unpacks the parallel bytes of DS3 data from the framed payload format. The Parallel to Serial Converter stage 672 converts the parallel bytes of data into a serial stream for writing to M DS3 services by the write DS3 Stream M port 669. The data-bits of the intermediate state restored, processed, and saved for each stream M for the DS3 service drop byte engine 662 are STS-1 row and column counter for each DS3 stream and a flag describing whether a given row has a stuffed "bit" or not (for stuffing an additional bit of data into a given row of the STS-1 SPE).

Figure 6E:
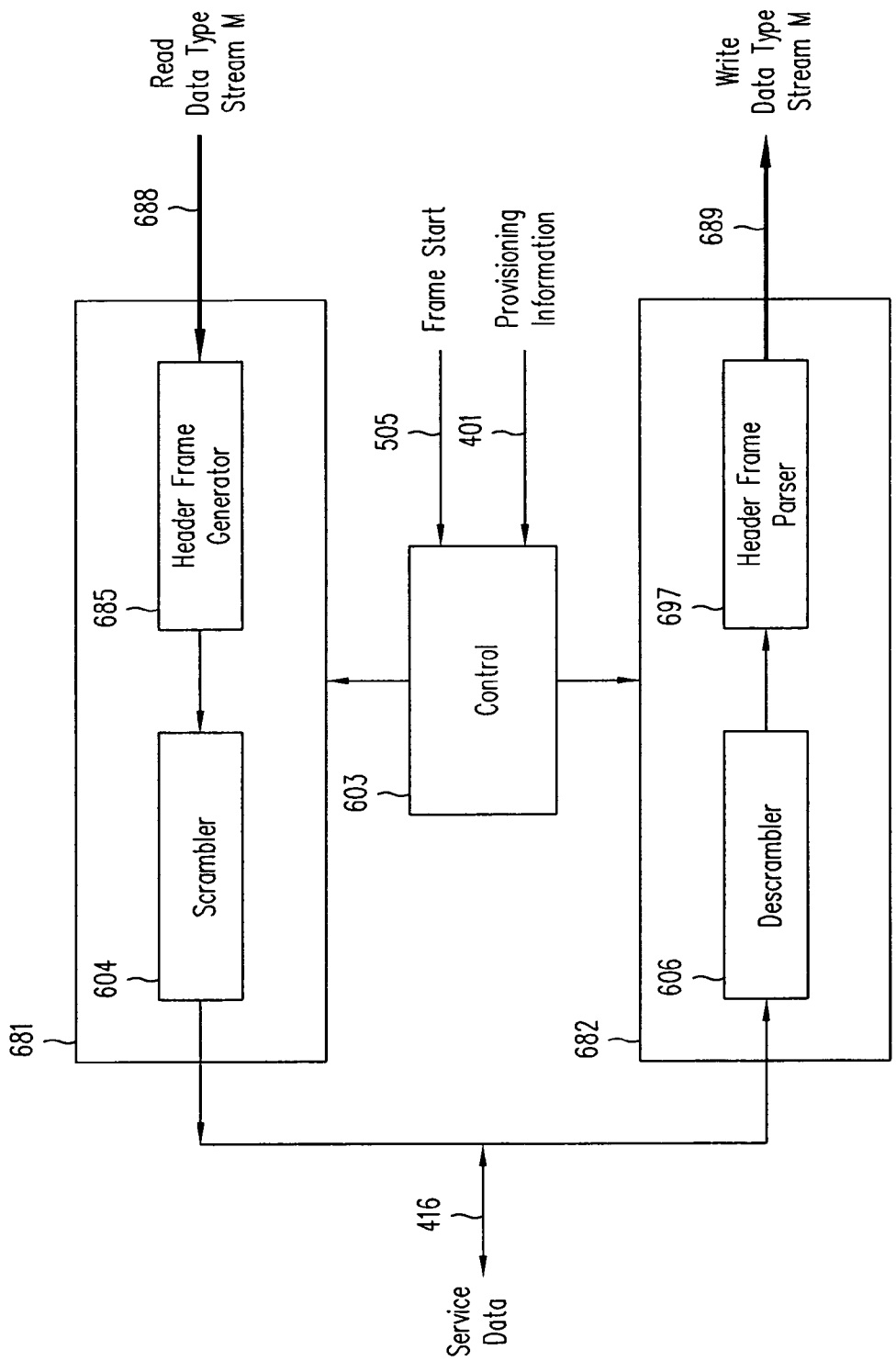
FIG. 6E is a block diagram of the services receive and transmit byte engines of the present invention for other services of various data types.

Referring to FIG. 6E, the Other services add byte engine 681 and the Other services drop byte engine 682 support other types of services (such as Fiber Channel, FDDI, etc.) and can interface and process M streams of such variable data types. The intermediate states of the add and drop byte engines 681, 682 are restored, processed, and saved for each stream in order to use one byte engine for processing. Control means 603 receives the provisioning information from the provisioning register 400 and controls the byte processing of the Other services add and drop byte engines 681, 682 on each stream M of Other services data. The Other services add byte engine 681 includes an Header/Frame generator stage 685 and the scrambler stage 604. The Header/Frame generator stage 685 generates the necessary header data from the data received over the Read data port 688 and maps the data into a frame. The scrambler stage 604 functions as previously described with respect to the Telecom service add byte engine 601. The Other services drop byte engine 682 includes the descrambler stage 606 and an Header/Frame parser stage 687. The descrambler stage 606 functions as previously described with respect to the Telecom service drop byte engine 602. The Header/Frame parser stage 687 demaps the framed data received by reading the elastic store over the port 416 and parses the header from the other services data in order to write it out over the write data port 689. The data-bits of the intermediate state restored, processed, and saved for each stream M for the Other services drop byte engine 662 are those states that are necessary to restart processing when the byte service drop byte engine returns to process the stream.

Figure 7:
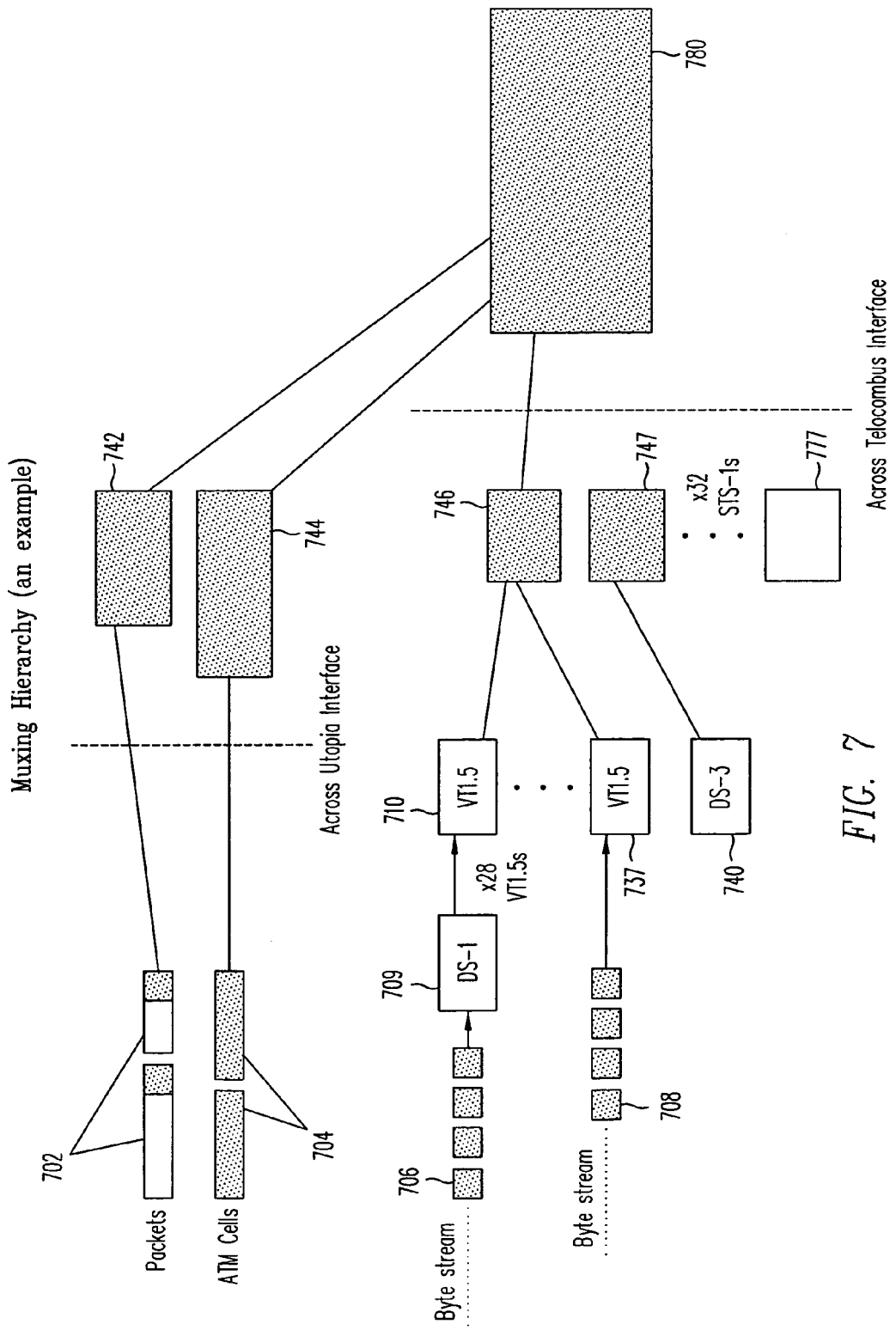
FIG. 7 is a block diagram depicting an exemplary communication system where service data of multiple services is multiplexed for transmission into the SONET/SDH communication system as SONET/SDH frames by the present invention.
Figure 8:
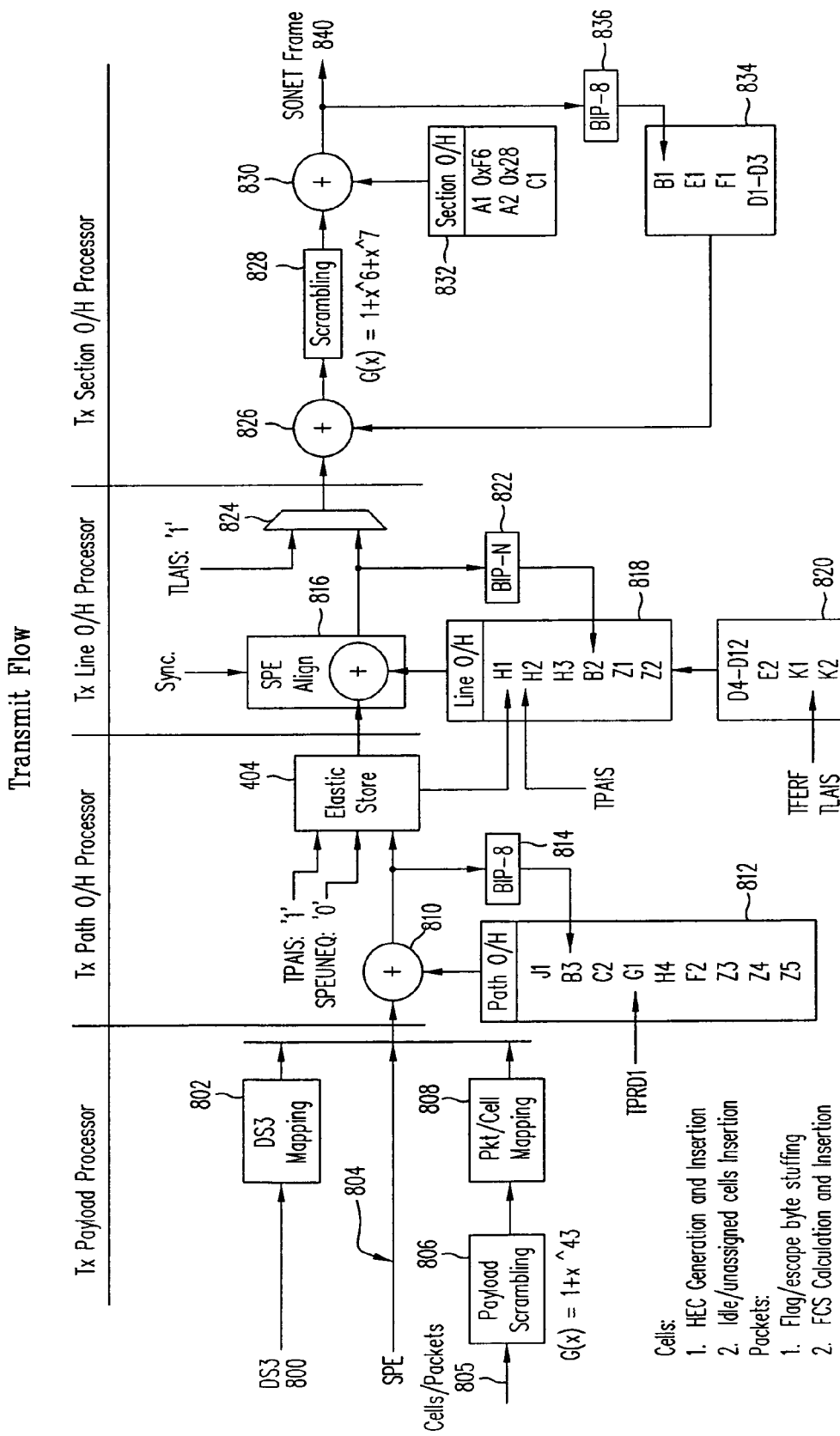
FIG. 8 is a detailed block diagram depicting the processing performed by the service receive byte engine and the SONET/SDH transmit byte engine of the present invention in an exemplary communication system for multiplexing service data received from multiple services and for transmission into the SONET/SDH communication system as SONET/SDH frames.
Figure 9:
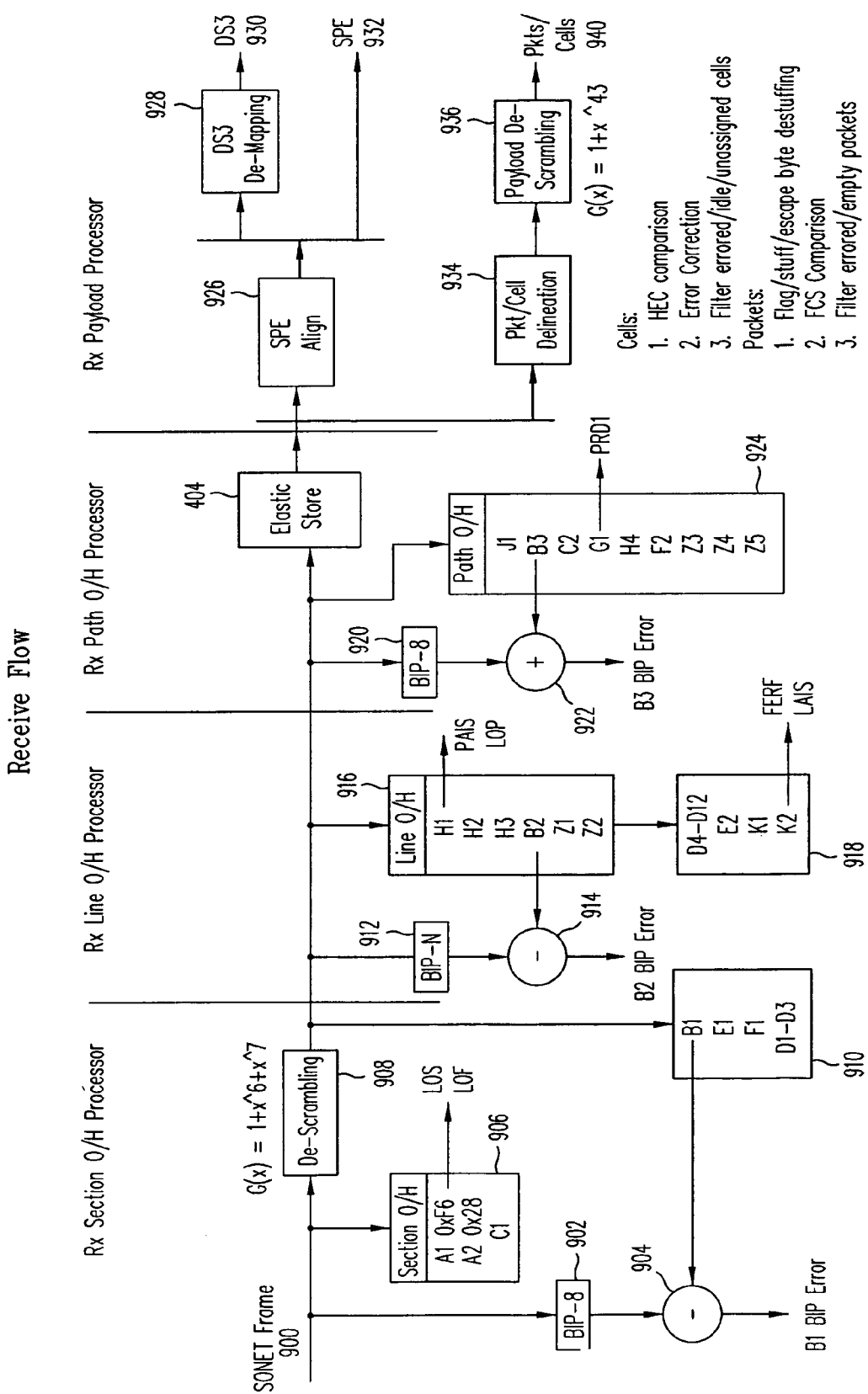
FIG. 9 is a block diagram depicting the processing performed by the SONET/SDH receive byte engine and the services transmit byte engine of the present invention in an exemplary communication system for receiving SONET/SDH frames and converting them into service data for transmission to the multiple services by the present invention.

FIGS. 7-9 illustrate examples of the functionality of the present invention. FIG. 7 shows an example of multiplexing multiple services into the SONET frame by the present invention. FIG. 8 shows an example of the data flow within the present invention upon receiving information from multiple services and processing data for transmission as a SONET/SDH frame. FIG. 9 shows an example of the data flow within the present invention upon receiving SONET/SDH frames and processing data for transmission out to the multiple services.

Referring to FIG. 7, Packets 702 received from a Packet Data Service is transformed by the present invention into STS-3c SONET Frames 742. ATM Cells 704 received from an ATM service are transformed by the present invention into an STS-12c SONET Frames 744. A byte stream of data 706 received from a data service is transformed by the present invention first into a DS-1 frame 709 and then into a VT1.5 frames 710. The present invention continues this process and generates 27 VT1.5 frames. A byte stream of data 708 received from a data service is transformed by the present invention directly into a VT1.5 frame 737. After generating 28 VT1.5 frames 710-737 the present invention transforms those into a single STS-1 frame 746. A DS-3 frame of data 740 received from a DS-3 data service is transformed by the present invention into 32 STS-1 SONET frames 747-777. When in our example the SONET communication system supports STS-48 frame structures, the present invention transforms one STS-3c frame 742, one STS-12c frame 744, the STS-1 frame 746, and the 32 STS-1 frames 747-777, which is equivalent in total to 48 STS-1 frames, into the one STS-48 frame 780. Processing of the services into the STS-48 frame 780 is performed a byte at a time by the present invention. For a communication system that is identical in transmitting and receiving, in the reverse direction the transformation of data is identical when receiving SONET STS-48 frames 780 for delivery to the various services 702, 704, 706, 708 and 740.

Referring to FIG. 8, a DS-3 service 800, a STS-1 service 804, and ATM cells/Packet service 805 are being supported by the service byte engine 406 while a SONET frame structure 840 is supported by the SONET byte engine 402. The DS-3 data 800 is mapped into an SPE of an STS-1 frame at step 802. The SPE 800 is directly mapped into an SPE of an STS-1 frame. The data of the Cells/packets 805 is scrambled at step 806 and then mapped into an SPE of an STS-1 frame at step 808. At step 810 the POH bytes 812 are added in order to finalize the SPE. At step 814 a parity check of the SPE is made in order to generate byte B3 of the POH 812. The SPE is then stored into the elastic storage means 404 by the service byte engine 406. The elastic storage means 404 is conceptually divided into N individual stores—each mapped to an STS-1 frame of an STS-N frame. If a higher level SONET frame such as an STS-Mc frame is desired to be stored into the elastic storage means, M elastic storage locations are used together to form a single elastic store for the STS-Mc frame. At the appropriate time for transmission, the SONET byte engine 402 reads the SPE stored in the elastic storage means 404 aligns it by synchronizing the SPE to the transmit clock and adds portions of the LOH, including bytes 818 (H1, H2, H3, B2, Z1, Z2) and bytes 820 (D4-D12, E2, K1, K2) at step 816. At step 822 the BIP-1 parity for the STS-1 frame is computed and added as byte B2 of the LOH 818. At step 816, the entire SPE may be overridden with a 1's pattern to cause a transmit alarm condition. At step 826 the remaining portion of the LOH, bytes 834 (B1, E1, F1, D1-D3), are added to the SPE. The data is then scrambled at step 828 to assure there are a required number of transitions within the data. At step 830 the SOH bytes 832 (A1, A2, C1) are added to complete the SONET frame 840 for transmission. At step 836, the BIP-1 parity of the SONET frame 840 is computed for inclusion as byte B1 of the LOH bytes 834 for the next transmitted frame.

Referring to FIG. 9, a SONET frame structure 900 is supported by the SONET byte engine 402 while a DS-3 service 930, a STS-1 service 932, and ATM cells/Packet service 940 are being supported by the service byte engine 406. The SONET byte engine 402 receives the SONET frame 900 and performs a parity check at step 902 on the SONET frame. At 906 a portion of the SOH bytes 906 which are not scrambled (A1, A2, C1) are parsed from the SONET frame and checked for correctness and alarms are flagged or not. At step 908 the remaining portion of the SONET frame is descrambled. At step 910 other SOH bytes 910 (B1, E1, F1, D1-D3) are parsed. At step 904, the SOH byte B1 is compared with the computed parity at step 902 and an B1 BIP Error is either flagged or not. At step 912 the parity error for a given STS-1 frame is computed from the STS-1 frame. At step 916 a portion of the LOH bytes 916 (H1, H2, H3, B2, Z1, Z2) are parsed. At step 918 additional LOH bytes 918 (D4-D12, E2, K1, K2) are parsed. AT step 914, the LOH byte B2 is compared with the computed parity at step 914 and a B2 BIP Error is either flagged or not. At step 920, the parity error for the SPE is computed. At step 924 POH bytes (J1, B2, C3, G1, H4, F2, Z3, Z4, Z5) are parsed from the SPE such that user data remains. At step 922, the POH byte B3 is compared with the parity BIP-8 computed at step 920. The SPE is stored into the elastic storage means 404 by the SONET Byte Engine 402. At the appropriate moment for transmission to the services, the Service byte engine 406 reads user data from the elastic storage means 404. For STS-1 frame services or DS-3 data services the service byte engine 406 aligns the SPE frame read from the elastic storage means to an output clock. Either the SPE is transmitted directly to SPE services at step 932 or the SPE frame, representing DS-3 data, is demapped at step 928 as a DS-3 frame and transmitted to the DS-3 service. Alternatively the user data may be associated with ATM Cell/Packet services in which case the user data read from the elastic storage means is delineated into Packets or ATM cells at step 934. For ATM cells, an HEC Comparison is additionally made, error correction is performed, and any error cells, idle cells, or unassigned cells are filtered out. For Packets, any flags, stuff bytes and escape bytes are unstuffed, an FCS comparison is made, and any error packets or empty packets are filtered out. At step 936 the Packet or ATM cell is descrambled and transmitted to the ATM Cell or Packet service 940.

The present invention has many advantages over the prior art. One advantage is that the bandwidth of a SONET/SDH frame may be flexibly changed by updating the provisioning information in the provisioning register such that changes in the SONET/SDH communication system or the services being supported are readily accommodated. Another advantage is that the present invention is more efficient in allocating the available SONET/SDH bandwidth to the multiple services that are supported. Another advantage is that the present invention can provide sufficient bandwidth to support the higher bandwidth services when demanded. Another advantage is that a byte engine is provided that can be flexibly be programmed to support different SONET/SDH formats. Another advantage is that a byte engine is provided that can be flexibly programmed to support different service data types and multiple service data streams.

While a preferred embodiment of the present invention has been disclosed and described in detail herein, it will be obvious to those skilled in the art that various changes in form and detail may be made therein without departing from the spirit and scope thereof.

What is claimed is:

1. A method comprising:
processing an STS-N frame of a SONET/SDH data stream, by a processor, wherein said processing further comprises
initializing a row counter, a column counter, and a subcolumn counter to initialized count values,
restoring one of N intermediate states by addressing a state vector array with a count value in the subcolumn counter, wherein the one of N intermediate states corresponds to a SONET STS-1 equivalent frame of the STS-N frame,
processing data in response to count values in the row counter, column counter, and provisioning information,
saving the one of N intermediate states after the processing of data by addressing the state vector array with the count value in the subcolumn counter, and
incrementing the count value in the subcolumn counter to process a next SONET STS-1 equivalent frame of the STS-N frame.

2. The method of claim 1 wherein said processing the STS-N frame further comprises:
initializing the subcolumn counter to the initialized count value and incrementing the count value of the column counter.

3. The method of claim 2 wherein said processing the STS-N frame further comprises:
initializing the column counter and subcolumn counter to the initialized count values and incrementing the count value in the row counter.

4. The method of claim 3 wherein said processing the STS-N frame further comprises:
performing said initializing the column counter and subcolumn counter to the initialized count values and incrementing the count value in the row counter in response to determining that the column counter equals a number of columns in the STS-N frame.

5. The method of claim 2 wherein said processing the STS-N frame further comprises:
performing said initializing the subcolumn counter to the initialized count value and incrementing the count value of the column counter in response to determining that the subcolumn counter equals N for the STS-N frame.

6. The method of claim 1 wherein said processing data further comprises:
selecting one of section overhead (SOH), line overhead (LOH), path overhead (POH), and payload data (SPE) in response to the count values in the row counter and column counter.

7. The method of claim 1 wherein said processing data further comprises:
selecting payload data in response to the count values in the row counter and column counter;
selecting selected service data using the provisioning information; and
mapping the selected service data into the payload data.

8. The method of claim 1 wherein said processing the STS-N frame further comprises:
performing said initializing the row counter, the column counter, and the subcolumn counter to initialized count values in response to determining that the row counter equals a number of rows in the STS-N frame.

9. The method of claim 1 wherein, for the data comprising section overhead or line overhead, the one of N intermediate states comprises one or more of data associated with:
a previous section bit interleaved parity (BIP) (B1);
a current section BIP;
a previous SPE pointer;
an increment or decrement pointer adjustment indication;
a new data flag;
a history for stability of a new pointer; and
a temporary new pointer.

10. The method of claim 1 wherein, for the data comprising the path overhead, the one of N intermediate states comprises one or more of data associated with:
a previous SPE Path BIP (B3);
a current SPE Path BIP;
an STS Path Signal Label (C2); and
an STS Path Trace (J1).

11. An apparatus comprising:
a memory;
means for processing an STS-N frame wherein said means for processing further comprises
means for initializing a row count value, a column count value, and a subcolumn count value to corresponding initial count values,
means for restoring from the memory an intermediate state corresponding to a subcolumn count value wherein the intermediate state further corresponds to a SONET STS-1 equivalent frame of the STS-N frame,
means for processing data from the STS-N frame in response to the row count value, the column count value and provisioning information,
means for updating the intermediate state in response to said means for processing data,
means for saving to the memory the updated intermediate state corresponding to the subcolumn count value, and
means for incrementing the subcolumn count value.

12. The apparatus of claim 11 wherein said means for processing data further comprises:
means for selecting one of section overhead data (SOH), line overhead data (LOH), path overhead data (POH), and payload data (SPE) in response to the row count value and the column count value.

13. The apparatus of claim 11 wherein said means for processing data further comprises:
means for selecting payload data in response to the row count value and the column count value;
means for selecting selected service data using the provisioning information; and
means for mapping the selected service data into the payload data.

14. The apparatus of claim 11 wherein said means for processing the STS-N frame further comprises:
means for initializing the subcolumn count value to the initial subcolumn count value; and
means for incrementing the column count value.

15. The apparatus of claim 14 wherein said means for initializing the subcolumn count value to the initial subcolumn count value and said means for incrementing the column count value are responsive to:

means for determining that the subcolumn count value equals N for the STS-N frame.

16. The apparatus of claim 14 wherein said means for processing the STS-N frame further comprises:

means for initializing the column count value and the subcolumn count value to the corresponding initial count values; and means for incrementing the row count value.

17. The apparatus of claim 16 wherein said means for initializing the column count value and the subcolumn count value to the corresponding initial count values and said means for incrementing the row count value are responsive to:

means for determining that the column counter equals a number of columns in the STS-N frame.

18. An apparatus comprising:

a row counter;

a column counter;

a subcolumn counter;

a first memory configured to store N intermediate states wherein each intermediate state corresponds to a SONET STS-1 equivalent frame of an STS-N frame;

a second memory configured to store provisioning information;

a processor, coupled to the first memory, the second memory, and counters, and configured to restore from the first memory an intermediate state corresponding to a count value of the subcolumn counter, process data from the STS-1 equivalent frame in response to the provisioning information and count values of the row counter and column counter, update the intermediate state corresponding to the count value of the subcolumn counter, save to the first memory the intermediate state corresponding to the count value of the subcolumn counter, and increment the count value of the subcolumn counter.

19. The apparatus of claim 18, wherein the processor comprises a section overhead (SOH)/line overhead (LOH) extractor; and the intermediate state corresponding to the count value of the subcolumn counter comprises one or more of data associated with a previous Section BIP (B1), a current Section BIP, a previous SPE pointer, an increment or decrement pointer adjustment indication, a new data flag, a history for stability of a new pointer, and a temporary new pointer.

20. The apparatus of claim 18, wherein the processor comprises an SPE path overhead processor; and the intermediate state corresponding to the count value of the subcolumn counter comprises one or more of data associated with a previous SPE Path BIP (B3), a current SPE Path BIP, an STS Path Signal Label (C2), and an STS Path Trace (J1).

* * * * *

UNITED STATES PATENT AND TRADEMARK OFFICE
CERTIFICATE OF CORRECTION

PATENT NO. : 7,606,265 B1
APPLICATION NO. : 10/141264
DATED : October 20, 2009
INVENTOR(S) : Sethuram et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1383 days.

Signed and Sealed this

Fifth Day of October, 2010

David J. Kappos
*Director of the United States Patent and Trademark Office*